US012057118B2

(12) United States Patent
Sakurai et al.

(10) Patent No.: US 12,057,118 B2
(45) Date of Patent: Aug. 6, 2024

(54) INFORMATION PROCESSING APPARATUS AND INFORMATION PROCESSING METHOD

(71) Applicant: SONY GROUP CORPORATION, Tokyo (JP)

(72) Inventors: Tatsuma Sakurai, Tokyo (JP); Ichitaro Kohara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 276 days.

(21) Appl. No.: 17/441,009

(22) PCT Filed: Mar. 9, 2020

(86) PCT No.: PCT/JP2020/009948
§ 371 (c)(1),
(2) Date: Sep. 20, 2021

(87) PCT Pub. No.: WO2020/203067
PCT Pub. Date: Oct. 8, 2020

(65) Prior Publication Data
US 2022/0157305 A1    May 19, 2022

(30) Foreign Application Priority Data

Mar. 29, 2019   (JP) ................. 2019-065746

(51) Int. Cl.
*G10L 15/20*   (2006.01)
*G05D 1/00*    (2006.01)
(Continued)

(52) U.S. Cl.
CPC ............ *G10L 15/22* (2013.01); *G05D 1/0016* (2013.01); *G10L 15/063* (2013.01); *G10L 15/30* (2013.01);
(Continued)

(58) Field of Classification Search
CPC ....... G10L 15/30; G10L 25/84; G10L 15/063; G10L 15/32; G10L 15/22;
(Continued)

(56) References Cited

U.S. PATENT DOCUMENTS 5,655,057 A * 8/1997 Takagi ................... G10L 15/22
                                                         704/226
9,070,367 B1   6/2015 Hoffmeister et al.
(Continued)

FOREIGN PATENT DOCUMENTS

CN     107077844 A    8/2017
CN     108604447 A    9/2018
(Continued)

OTHER PUBLICATIONS

Extended European Search Report of EP Application No. 20784973.8, issued on Jun. 7, 2022, 07 pages.
(Continued)

*Primary Examiner* — Md S Elahee
(74) *Attorney, Agent, or Firm* — CHIP LAW GROUP

(57) ABSTRACT

Provided is an information processing apparatus including a control section that controls operations of operation bodies in accordance with a result of a voice recognition process. In accordance with a result of a voice recognition process that is based on a voice collected by one of the operation bodies or a voice recognition environment recognized from sensor information collected by one of the operation bodies, the control section controls an operation of another one of the operation bodies.

20 Claims, 28 Drawing Sheets

(51) Int. Cl.
*G10L 15/06* (2013.01)
*G10L 15/22* (2006.01)
*G10L 15/30* (2013.01)
*G10L 25/84* (2013.01)

(52) U.S. Cl.
CPC ...... *G10L 25/84* (2013.01); *G10L 2015/0635* (2013.01); *G10L 2015/223* (2013.01)

(58) Field of Classification Search
CPC ......... G10L 2015/228; G10L 2015/223; G10L 2015/0635; G10L 25/51; G05D 1/0016; G05D 2201/0214; B25J 11/0005; G06F 40/242
USPC ........................................................... 704/233
See application file for complete search history.

(56) References Cited

U.S. PATENT DOCUMENTS

| | | | | |
|---|---|---|---|---|
| 2006/0100856 | A1* | 5/2006 | Kang ................ | G06F 40/242 704/9 |
| 2019/0019513 | A1 | 1/2019 | Kirihara | |

FOREIGN PATENT DOCUMENTS

| | | | |
|---|---|---|---|
| CN | 109119078 | A | 1/2019 |
| DE | 112016006351 | T5 | 10/2018 |
| EP | 3413303 | A1 | 12/2018 |
| JP | 2002-337079 | A | 11/2002 |
| JP | 2016-130800 | A1 | 7/2016 |
| JP | 2017-138476 | A | 8/2017 |
| JP | 2017191531 | A | 10/2017 |
| JP | 2018-081233 | A | 5/2018 |
| JP | 2018-81233 | A | 5/2018 |
| JP | 2020-46478 | A | 3/2020 |
| WO | WO-2016052164 | A1 | 4/2016 |
| WO | 2017/134935 | A1 | 8/2017 |
| WO | 2018/107389 | A1 | 6/2018 |
| WO | WO-2018107389 | A1 * | 6/2018 ............. G10L 15/22 |

OTHER PUBLICATIONS

International Search Report and Written Opinion of PCT Application No. PCT/JP2020/009948, issued on Jun. 16, 2020, 10 pages of ISRWO.

* cited by examiner

FIG.5
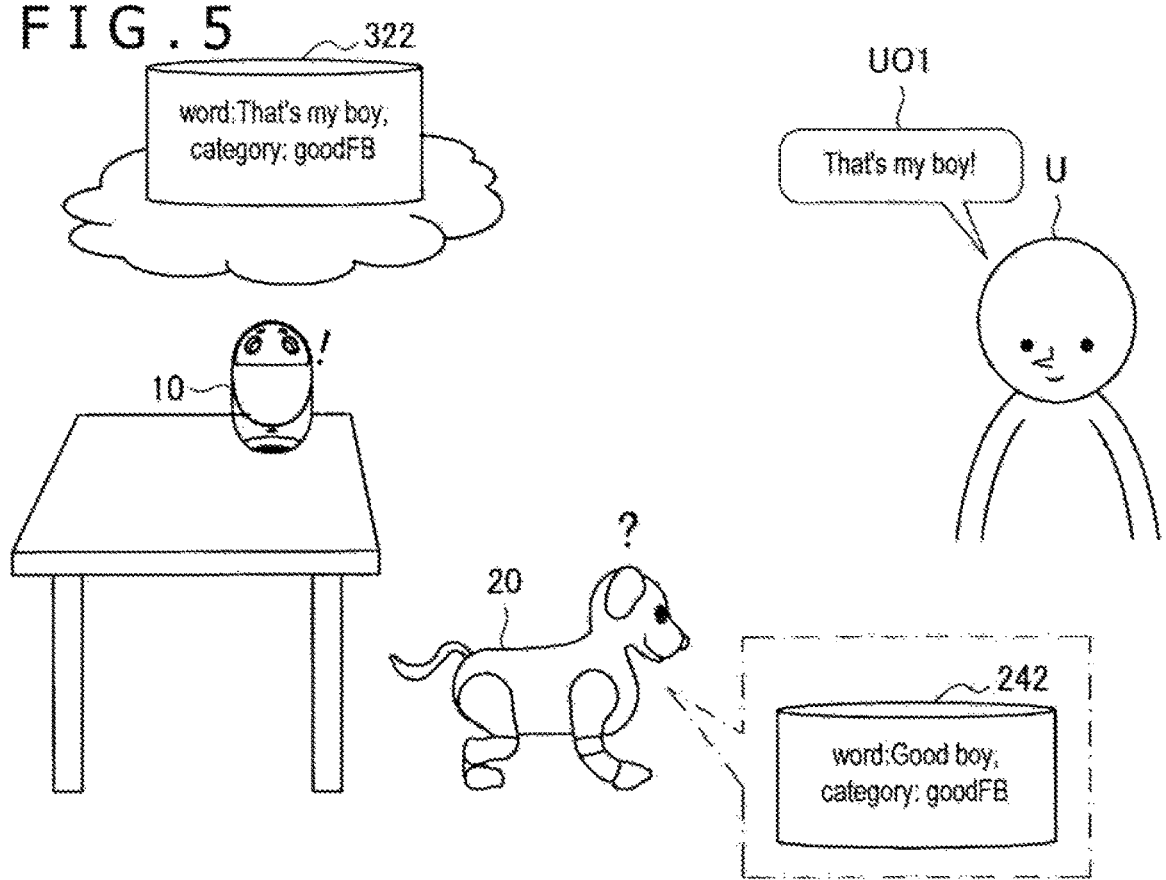
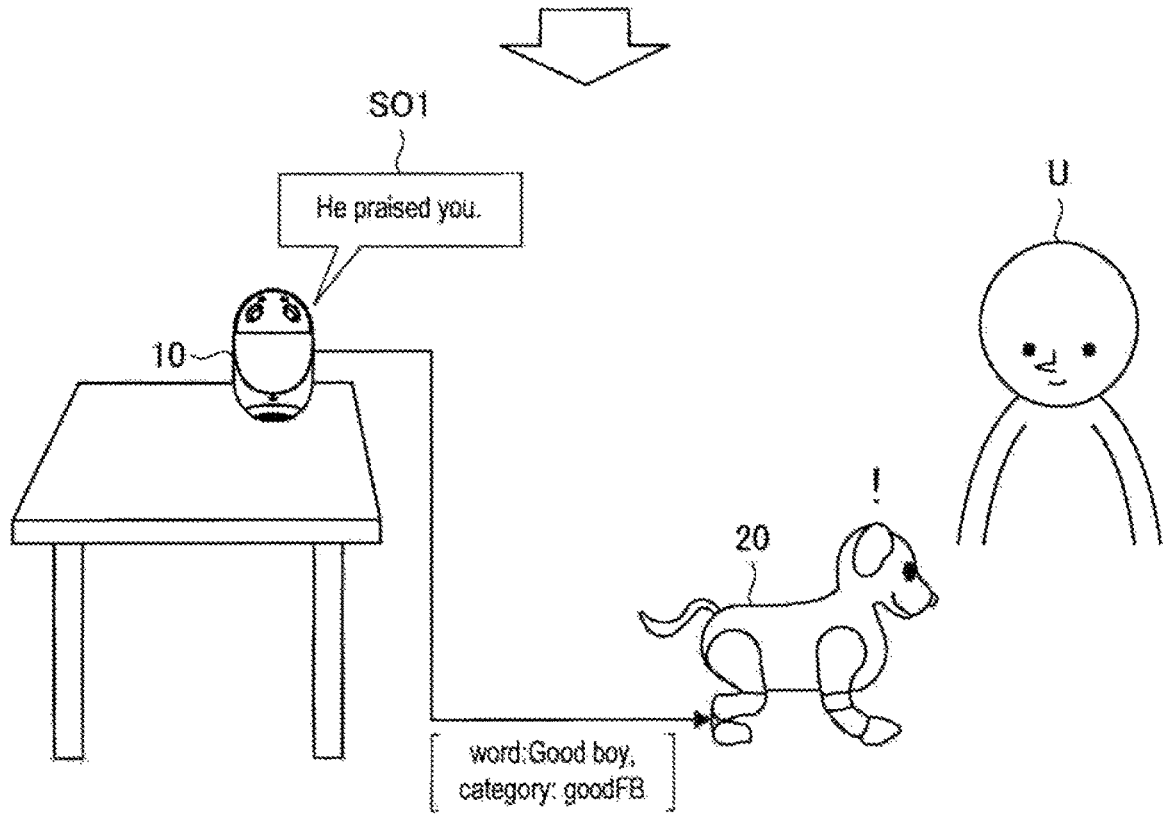

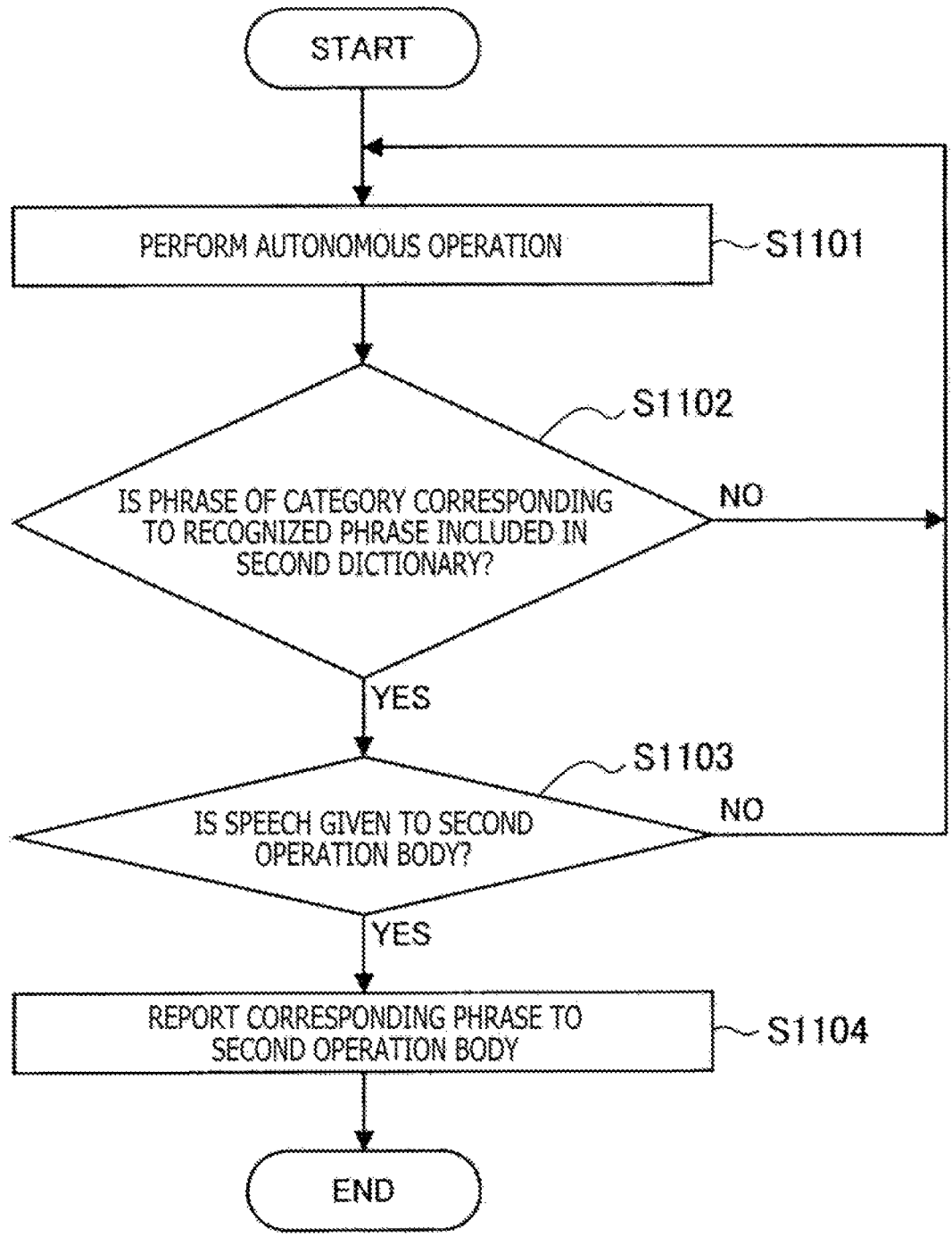

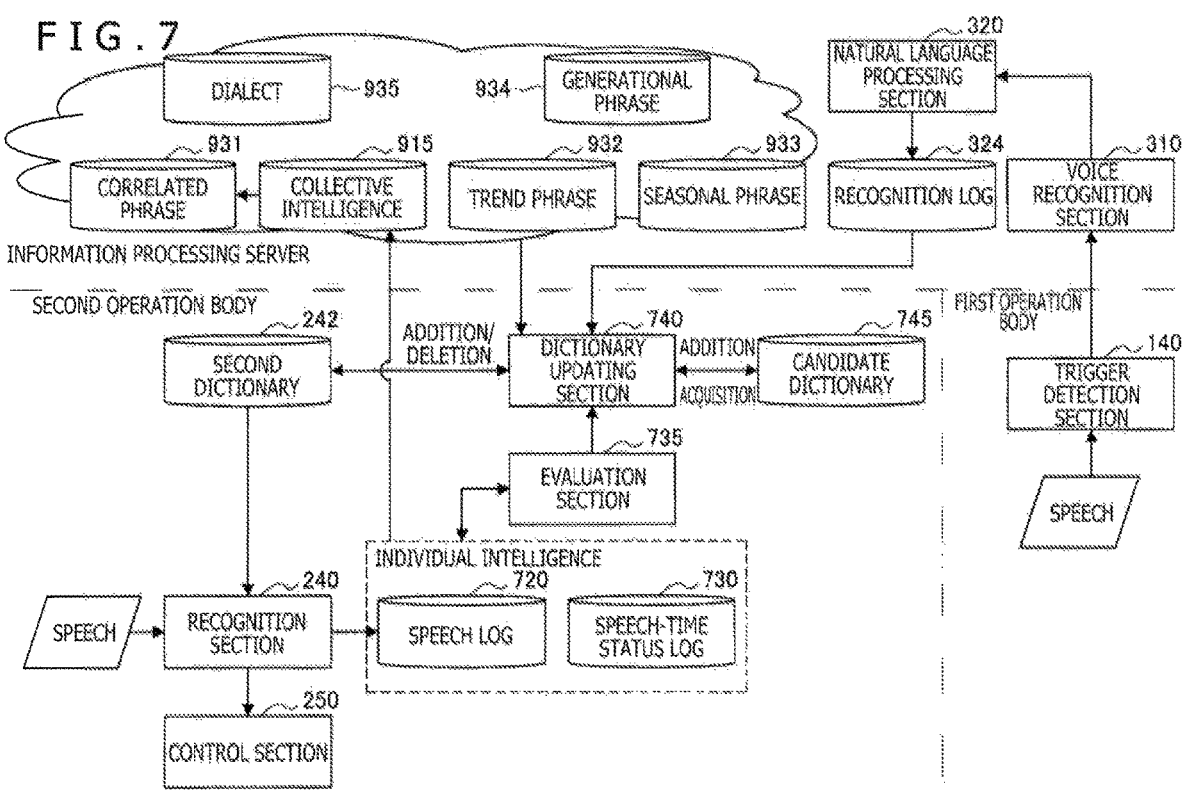

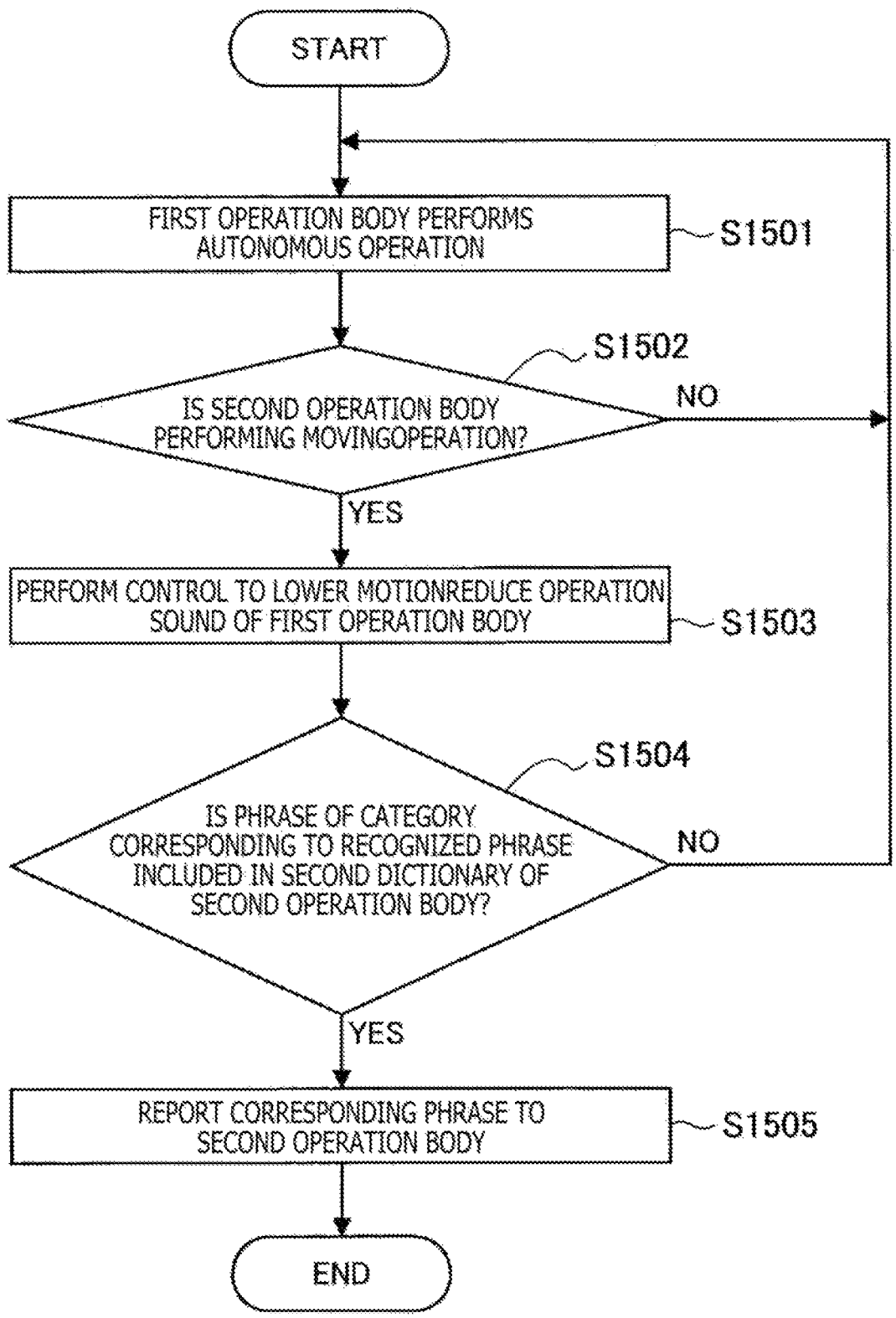

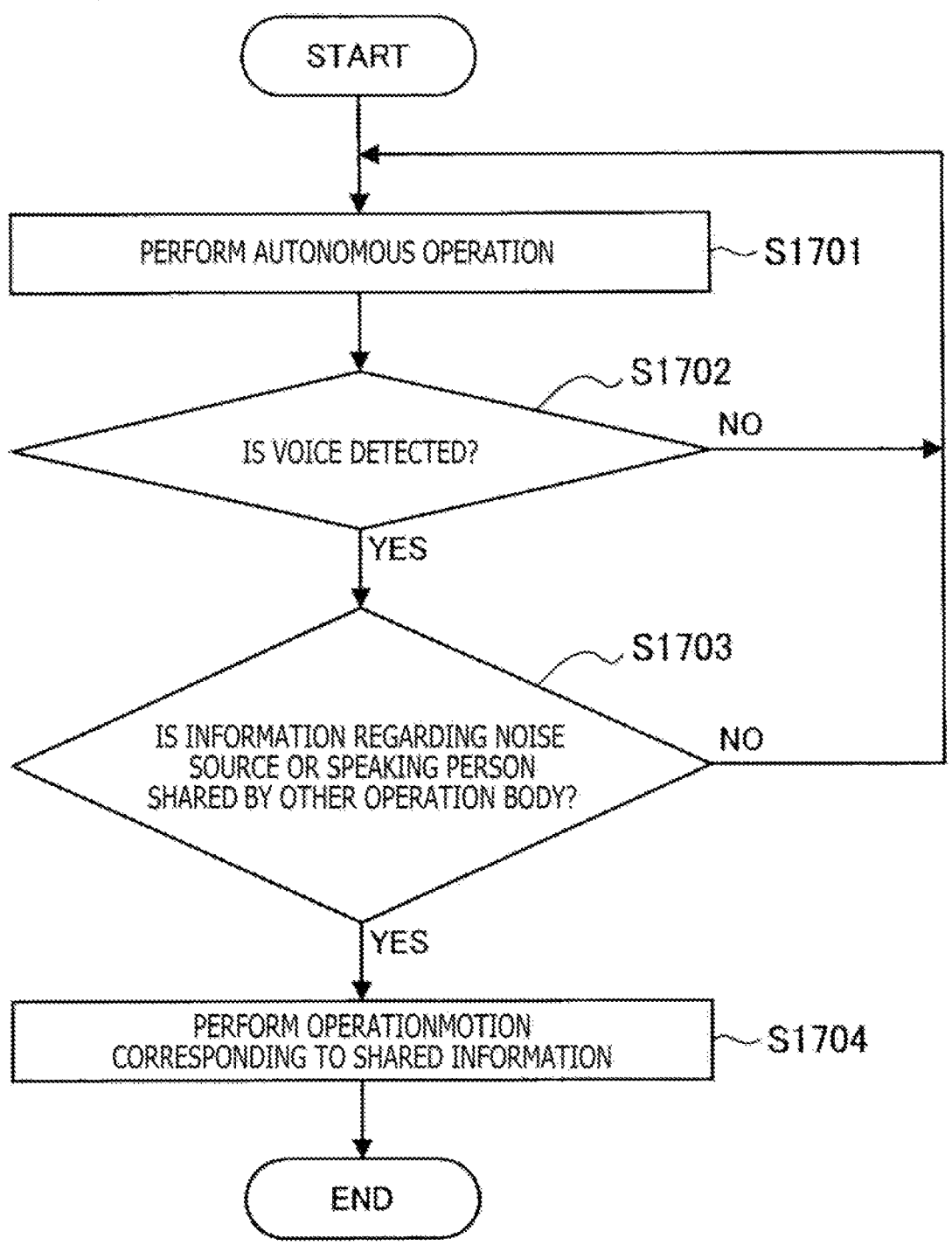

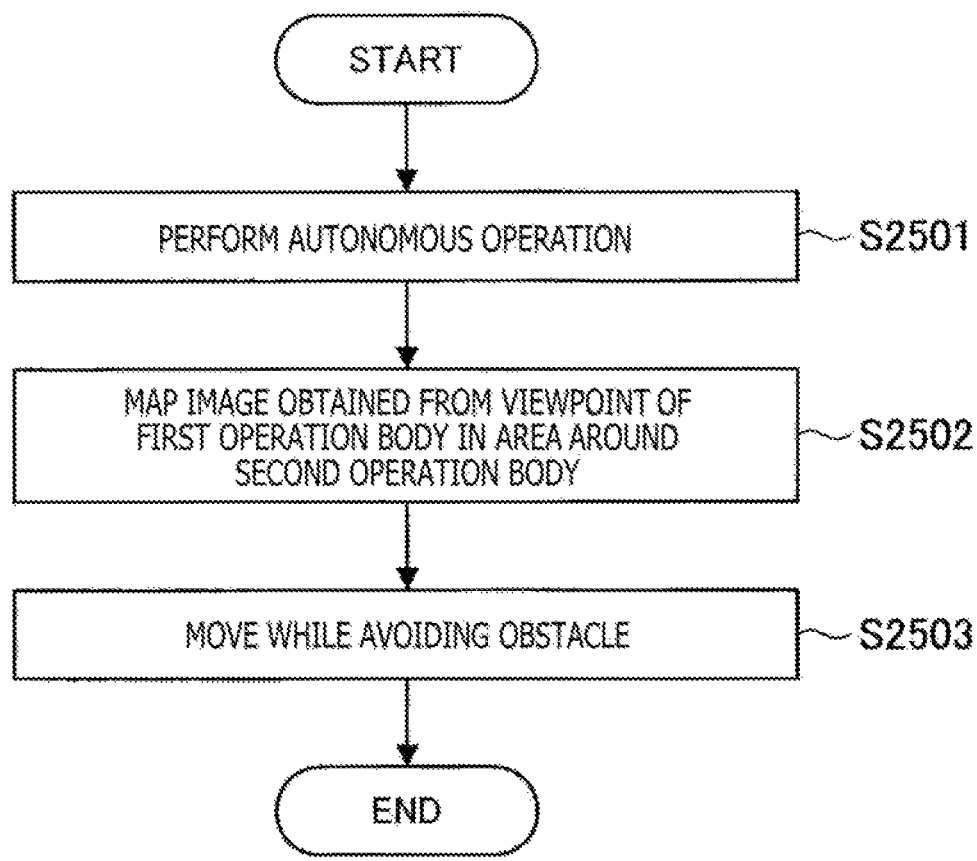

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/009948 filed on Mar. 9, 2020, which claims priority benefit of Japanese Patent Application No. JP 2019-065746 filed in the Japan Patent Office on Mar. 29, 2019. Each of the above-referenced applications is hereby incorporated herein by reference in its entirety.

TECHNICAL FIELD

The present disclosure relates to an information processing apparatus, an information processing method, and a program.

BACKGROUND ART

In recent years, various types of apparatuses that perform an operation based on a voice recognition process have become widespread. Moreover, many technologies for improving voice recognition process accuracy have been developed. For example, PTL 1 discloses a technology of improving voice recognition accuracy by lowering a sound volume level of a separate apparatus that can become a noise source.

CITATION LIST

Patent Literature

[PTL 1]
Japanese Patent Laid-open No. 2017-138476

SUMMARY

Technical Problem

Meanwhile, in a case where there are a plurality of operation bodies that each perform an operation on the basis of a voice recognition process in an environment, when recognition results that are based on information collected by the respective operation bodies are shared, an operation that is more suitable to the circumstance can be realized.

Solution to Problem

The present disclosure provides an information processing apparatus including a control section that controls operations of operation bodies in accordance with a result of a voice recognition process, in which, in accordance with a result of a voice recognition process that is based on a voice collected by one of the operation bodies or a voice recognition environment recognized from sensor information collected by one of the operation bodies, the control section controls an operation of another one of the operation bodies.

In addition, the present disclosure provides an information processing method including controlling operations of operation bodies by means of a processor in accordance with a result of a voice recognition process, in which the controlling further includes controlling an operation of another one of the operation bodies in accordance with a result of a voice recognition process that is based on a voice collected by one of the operation bodies or a voice recognition environment recognized from sensor information collected by one of the operation bodies.

In addition, the present disclosures provides a program for causing a computer to function as an information processing apparatus including a control section that controls operations of operation bodies in accordance with a result of a voice recognition process, in which, in accordance with a result of a voice recognition process that is based on a voice collected by one of the operation bodies or a voice recognition environment recognized from sensor information collected by one of the operation bodies, the control section controls an operation of another one of the operation bodies.

BRIEF DESCRIPTION OF DRAWINGS

FIG. 5 is a diagram for explaining voice recognition result sharing according to the embodiment.

FIG. 6A is a flowchart depicting an operation flow of the first operation body 10 and the information processing server 30 in the voice recognition result sharing according to the embodiment.

FIG. 7 is a diagram for explaining replacement of a set of phrases registered in a second dictionary 242 according to the embodiment.

FIG. 11 is a flowchart depicting a flow of operation control which is performed, in accordance with an operation state of one operation body, on another operation body according to the embodiment.

FIG. 13B is a flowchart depicting an operation flow of a sharing destination in noise source/speaking person-related information sharing according to the embodiment.

FIG. 23B is a flowchart depicting a flow in which the second operation body 20 operates in accordance with a movement instruction provided from the first operation body 10 according to the embodiment.

DESCRIPTION OF EMBODIMENT

Figure 1:
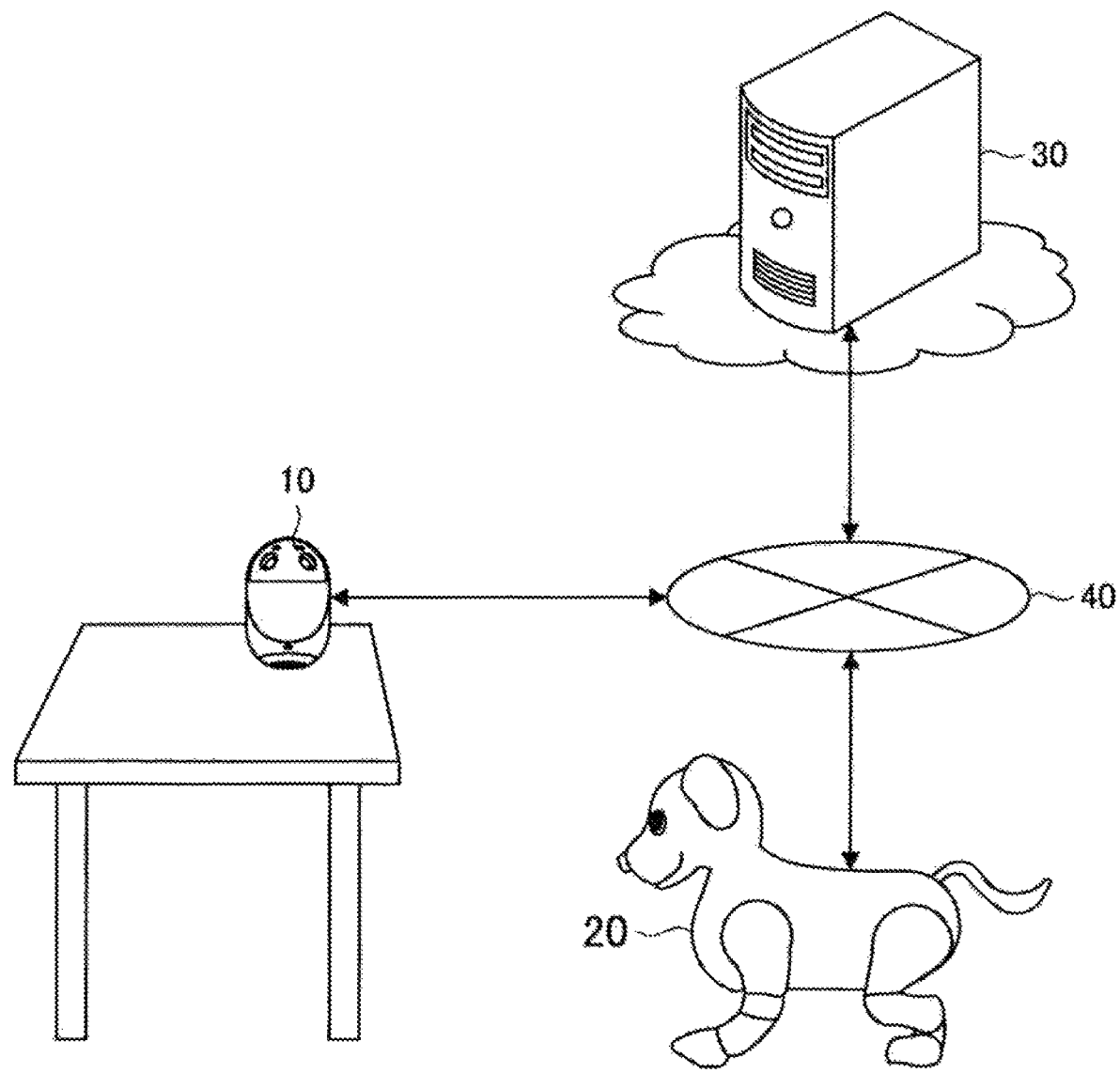
FIG. 1 is a diagram depicting a configuration example of an information processing system according to one embodiment of the present disclosure.

Hereinafter, preferable embodiment according to the present disclosure will be explained in detail with reference to the attached drawings. It is to be noted that component elements having substantially the same functional configuration are denoted by the same reference numeral throughout the present description and the drawings. Thus, an overlapping explanation thereof will be omitted.

It is to be noted that the explanation will be given in accordance with the following order.

1. Embodiment
   1.1. Outline
   1.2. System Configuration Example
   1.3. Functional Configuration Example of First Operation body 10
   1.4. Functional Configuration Example of Second Operation body 20
   1.5. Functional Configuration Example of Information Processing Server 30
   1.6. Details of Functions
2. Hardware Configuration Example of Information Processing Server 30
3. Conclusion <1. Embodiment>
<<1.1. Outline>>

In recent years, various types of apparatuses that recognize a user speech and perform an operation in accordance with the recognition result have been developed. Examples of such an apparatus include a voice agent apparatus that provides a variety of functions through an audio conversation with a user, and an autonomous operation body the behavior of which varies in accordance with a recognized user speech or a surrounding environment.

The above-mentioned apparatuses include an apparatus that transmits collected voice data to a server over a network, and performs an operation in accordance with a result of a voice recognition process executed at a server side, and an apparatus that executes a voice recognition process by means of a computer installed in a casing (client).

In a case where a voice recognition process is executed at a server side, an abundance of computation resources can be easily prepared. Thus, high recognition accuracy is usually expected. In contrast, in a case where a voice recognition process is executed at a client side, there is a limitation on computation resources in many cases, but the number of recognizable phrases is suppressed, for example, to reduce the computation amount and improve the recognition accuracy. Thus, a quick response can be realized.

However, in a case where a voice recognition process is executed at a client side, a set of phrases spoken by a user may deviate from a set of phrases included in a previously prepared voice recognition dictionary. In this case, a speech made by the user is difficult to correctly recognize.

Also, for example, in a case where an apparatus collecting a voice sound performs an operation with a relatively large operation sound, the operation sound of the apparatus hinders the voice sound collection during a certain operation state. Accordingly, there is a possibility that the voice recognition accuracy is deteriorated.

The technical concept of the present disclosure has been generated in view of the above circumstances, and can cause each operation body to perform an operation more suitable for the circumstance in an environment where there are a plurality of operation bodies that each perform an operation based on a voice recognition process.

In order to achieve this, an information processing method according to one embodiment of the present disclosure includes controlling operations of an operation body by means of a processor in accordance with a result of a voice recognition process. In addition, the controlling includes controlling one of the operation bodies in accordance with a result of a voice recognition process that is based on a voice collected by another one of the operation bodies or a voice recognition environment recognized from sensor information collected by another one of the operation bodies.

<<1.2. System Configuration Example>>

FIG. 1 is a diagram depicting a configuration example of an information processing system according to one embodiment of the present disclosure. An information processing server 30 according to the present embodiment may include a plurality of operation bodies that each perform an operation based on a voice recognition process. In one example depicted in FIG. 1, the information processing system according to the present embodiment includes a first operation body 10, a second operation body 20, and the information processing server 30. In addition, these components are connected to be mutually communicable over a network 40.

(First Operation body 10)

The first operation body 10 according to the present embodiment is one example of an operation body (information processing apparatus) that performs an operation based on a voice recognition process. The first operation body 10 according to the present embodiment transmits a collected voice to the information processing server 30, and performs an operation in accordance with a result of a voice recognition process executed by the information processing server 30. The first operation body 10 according to the present embodiment may be capable of making a response speech in response to a user speech in accordance with the voice recognition process result, or actively talking to a user according to a recognized environment or the like.

In addition, the first operation body 10 according to the present embodiment may be an autonomous mobile body capable of traveling and rotating by using wheels provided on the bottom part thereof, for example. The size and the shape of the first operation body 10 according to the present embodiment may be set such that the first operation body 10 can be placed on a table, for example. The first operation body 10 according to the present embodiment performs various operations including making a speech in accordance with a voice recognition process result supplied by the information processing server 30 or any other recognition results while autonomously traveling.

(Second Operation Body 20)

Like the first operation body 10, the second operation body 20 according to the present embodiment is one example of an operation body (information processing apparatus) that performs an operation in accordance with a voice recognition process. The second operation body 20 according to the present embodiment differs from the first operation body 10 in being configured to execute a voice recognition process at the second operation body 20 side, that is, a local side.

For example, the second operation body 20 according to the present embodiment may be a quadrupedal autonomous mobile body that is designed to resemble an animal such as a dog, as depicted in the drawings. The second operation body 20 according to the present embodiment makes a response to a user by uttering a cry or the like, in accordance with a result of a voice recognition process executed at the local side.

(Information Processing Server 30)

The information processing server 30 according to the present embodiment is an information processing apparatus executing a voice recognition process or a natural language comprehending process that is based on a voice collected by the first operation body 10. In addition, in accordance with a result of a voice recognition process that is based on a voice collected by one of the operation bodies or a voice recognition environment recognized on the basis of sensor information collected by one of the operation bodies, the information processing server 30 according to the present embodiment may control an operation of the other operation body.

(Network 40)

The network 40 has a function of establishing connection between the above-mentioned components. The network 40 may include a public line network such as the Internet, a telephone line network, or a satellite communication network, various types of LANs (Local Area Networks) including the Ethernet (registered trademark) and a WAN (Wide Area Network), etc. Alternatively, the network 40 may include a dedicated line network such as IP-VPN (Internet Protocol-Virtual Private Network). Alternatively, the network 40 may include a wireless communication network of Wi-Fi (registered trademark), Bluetooth (registered trademark), or the like.

The configuration example of the information processing system according to the present embodiment has been explained so far. It is to be noted that the above configuration explained with use of FIG. 1 is one example, and the configuration of the information processing system according to the present embodiment is not limited to this example. For example, the information processing system according to the present embodiment may include three or more operation bodies. In addition, at least one of the operation bodies is not limited to autonomous mobile bodies, and a stationary type or indoor embedded type agent apparatus may be adopted therefor. The configuration of the information processing system according to the present embodiment can be flexibly modified according to specifications or management.

<<1.3. Functional Configuration Example of First Operation Body 10>>

Figure 2:
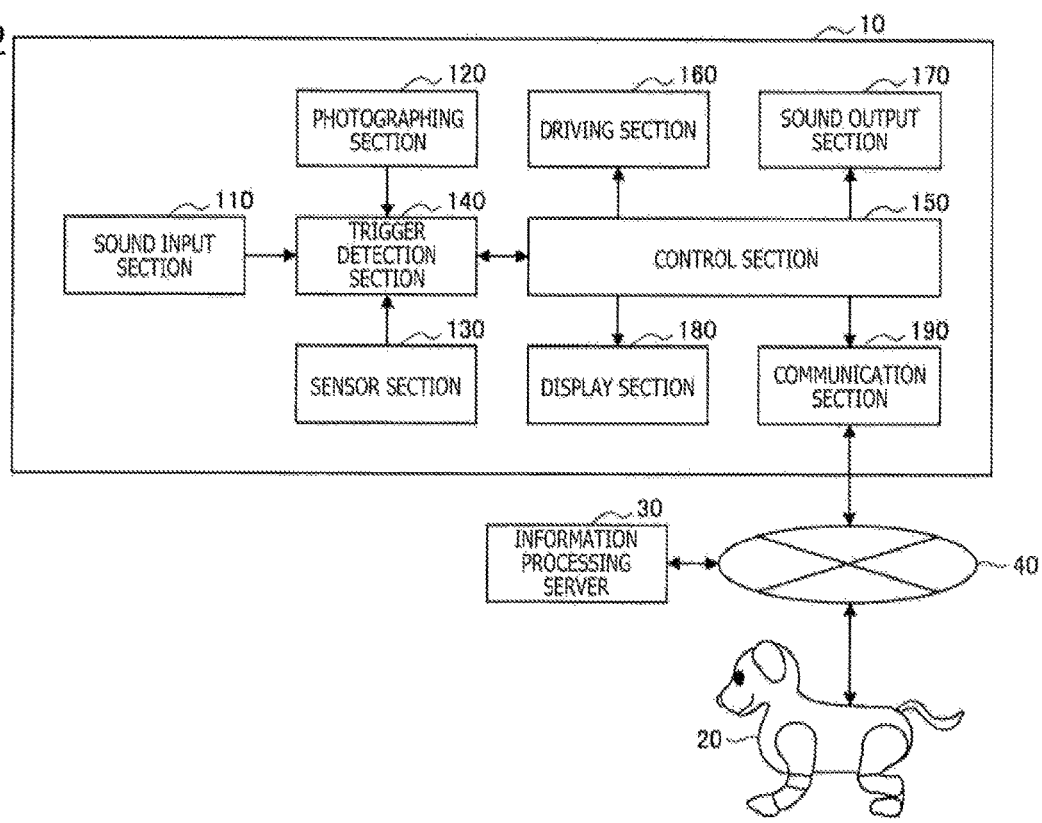
FIG. 2 is a block diagram depicting a functional configuration example of a first operation body 10 according to the embodiment.

Next, the functional configuration example of the first operation body 10 according to the present embodiment will be explained. FIG. 2 is a block diagram depicting a functional configuration example of the first operation body 10 according to the present embodiment. As depicted in FIG. 2, the first operation body 10 according to the present embodiment includes a sound input section 110, a photographing section 120, a sensor section 130, a trigger detection section 140, a control section 150, a driving section 160, a sound output section 170, a display section 180, and a communication section 190.

(Sound Input Section 110)

The sound input section 110 according to the present embodiment collects various types of sounds including user speech voices. Therefore, the sound input section 110 according to the present embodiment includes at least one microphone.

(Photographing Section 120)

The photographing section 120 according to the present embodiment takes an image of a user or an image of the surrounding environment. Therefore, the photographing section 120 according to the present embodiment includes an imaging element.

The sensor section 130 according to the present embodiment collects sensor information concerning a user, the surrounding environment, and the first operation body 10 by using various types of sensor devices. For example, the sensor section 130 according to the present embodiment includes a ToF sensor, an inertial sensor, an infrared sensor, an illuminance sensor, a millimeter wave radar, a touch sensor, a GNSS (Global Navigation Satellite System) signal receiver, etc.

(Trigger Detection Section 140)

The trigger detection section 140 according to the present embodiment detects various types of triggers regarding a start of a voice recognition process, on the basis of various information collected by the sound input section 110, the photographing section 120, and the sensor section 130.

The trigger detection section 140 according to the present embodiment may detect a specific word (activation word) on the basis of a speech voice collected by the sound input section 110 and a specific speech expression freely registered by a user, for example.

In addition, the trigger detection section 140 according to the present embodiment may detect a user's face/body or a specific user gesture on the basis of an image captured by the photographing section 120, for example.

In addition, the trigger detection section 140 according to the present embodiment may detect that a user picks up the first operation body 10, or places the first operation body 10 at rest, on the basis of acceleration information collected by the sensor section 130, for example.

(Control Section 150)

The control section 150 according to the present embodiment controls the sections included in the first operation body 10. In addition, the control section 150 according to the present embodiment may control an operation of the second operation body 20 indirectly or directly by reporting, to the second operation body 20, a result of a voice recognition process executed by the information processing server 30, in a manner described later.

(Driving Section 160)

The driving section 160 according to the present embodiment performs various operations under control of the control section 150. The driving section 160 according to the present embodiment may include a plurality of actuators (e.g. motors), wheels, etc., for example.

(Sound Output Section 170)

The sound output section 170 according to the present embodiment outputs a system voice or the like under control of the control section 150. Therefore, the sound output section 170 according to the present embodiment includes an amplifier and a loudspeaker.

(Display Section 180)

The display section 180 according to the present embodiment presents visual information under control of the control section 150. The display section 180 according to the present embodiment includes an LED or OLED for eyes, for example.

(Communication Section 190)

The communication section 190 according to the present embodiment performs information communication with the second operation body 20 and the information processing server 30 over the network 40. For example, the communication section 190 according to the present embodiment transmits a user speech voice collected by the sound input section 110 to the information processing server 30, and receives a voice recognition result of the speech voice and response information.

The functional configuration example of the first operation body 10 according to the present embodiment has been explained so far. It is to be noted that the above-mentioned configuration explained with use of FIG. 2 is one example, and the functional configuration of the first operation body 10 according to the present embodiment is not limited to this example. The functional configuration of the first operation body 10 according to the present embodiment can be flexibly modified according to specifications or management.

<<1.4. Functional Configuration Example of Second Operation Body 20>>

Figure 3:
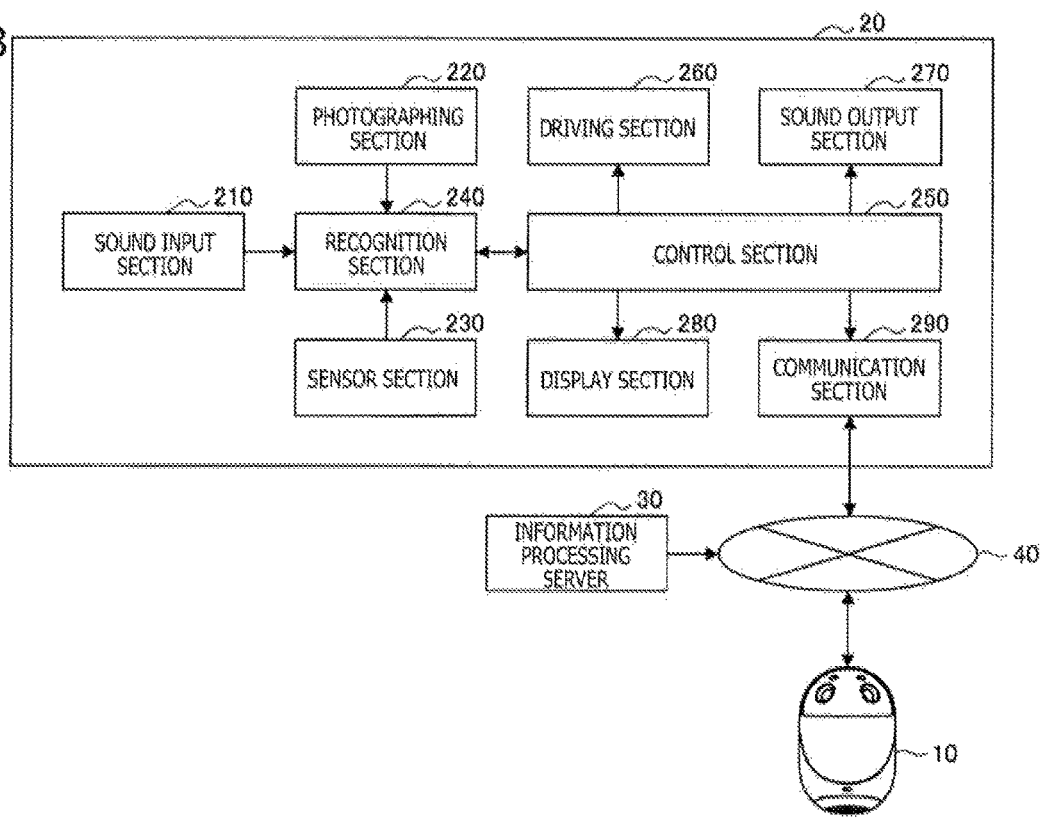
FIG. 3 is a block diagram depicting a functional configuration example of a second operation body 20 according to the embodiment.

Next, a functional configuration example of the second operation body 20 according to the present embodiment will be explained. FIG. 3 is a block diagram depicting a functional configuration example of the second operation body 20 according to the present embodiment. As depicted in FIG. 3, the second operation body 20 according to the present embodiment includes a sound input section 210, a photographing section 220, a sensor section 230, a recognition section 240, a control section 250, a driving section 260, a sound output section 270, a display section 280, and a communication section 290.

(Sound Input Section 210)

The sound input section 210 according to the present embodiment collects various types of sounds including user speech voices. Therefore, the sound input section 210 according to the present embodiment includes at least one microphone.

(Photographing Section 220)

The photographing section 220 according to the present embodiment takes an image of a user or an image of the surrounding environment. Therefore, the photographing section 220 according to the present embodiment includes an imaging element. The photographing section 220 may include two wide angle cameras on the tip of nose and the back part of the second operation body 20, for example. In this case, the wide angle camera disposed on the tip of nose captures an image corresponding to the forward visual field of the second operation body 20 (i.e. the visual field of the dog), while the wide angle camera disposed on the back part captures an image of the surrounding region centered on the upper side. The second operation body 20 can implement SLAM (Simultaneous Localization and Mapping) by extracting a feature of a ceiling on the basis of an image captured by the wide angle camera disposed on the back part, for example.

The sensor section 230 according to the present embodiment collects sensor information concerning a user, the surrounding environment, and the second operation body 20 by using various types of sensor devices. For example, the sensor section 230 according to the present embodiment includes a ranging sensor, an inertial sensor, an infrared sensor, an illuminance sensor, a touch sensor, a grounding sensor, etc.

(Recognition Section 240)

The recognition section 240 according to the present embodiment executes various recognition processes in accordance with information obtained by the sound input section 210, the photographing section 220, and the sensor section 230. For example, the recognition section 240 according to the present embodiment executes, at the local side, a voice recognition process that is based on a user speech voice obtained by the sound input section 210. Further, the recognition section 240 may recognize a speaking person, an expression or a visual line, an object, an action, a spatial region, a color, a shape, a marker, an obstacle, a step, a brightness level, etc.

(Control Section 250)

The control section 250 according to the present embodiment controls the sections included in the second operation body 20 in accordance with results of recognition processes executed by the recognition section 240. In addition, the control section 250 according to the present embodiment may control an operation of a separate operation body (e.g. the first operation body or the second operation body) indirectly or directly by reporting results of various recognition processes executed by the recognition section 240 to the separate operation body.

(Driving Section 260)

The driving section 260 has a function of causing a bending action of a plurality of joints included in the second operation body 20 under control of the control section 250. More specifically, the driving section 260 drives respective actuators of the joints under control of the control section 250.

(Sound Output Section 270)

The sound output section 270 according to the present embodiment outputs a sound imitating a cry of a dog or the like, under control of the control section 250. Therefore, the sound output section 170 according to the present embodiment includes an amplifier and a loudspeaker.

(Display Section 280)

The display section 280 according to the present embodiment presents visual information under control of the control section 250. The display section 280 according to the present embodiment includes an LED or OLED for eyes, for example.

(Communication Section 290)

The communication section 290 according to the present embodiment performs information communication with the first operation body 10 and the information processing server 30 over the network 40. From the first operation body 10 or the information processing server 30, the communication section 290 according to the present embodiment receives a result of a voice recognition process that is based on a voice collected by a separate operation body, for example.

The functional configuration example of the second operation body 20 according to the present embodiment has been explained so far. It is to be noted that the above-mentioned configuration explained with use of FIG. 3 is one example, and the functional configuration of the second operation body 20 according to the present embodiment is not limited to this example. The functional configuration of the second operation body 20 according to the present embodiment can be flexibly modified according to specifications or management.

<<1.5. Functional Configuration Example of Information Processing Server 30>>

Figure 4:
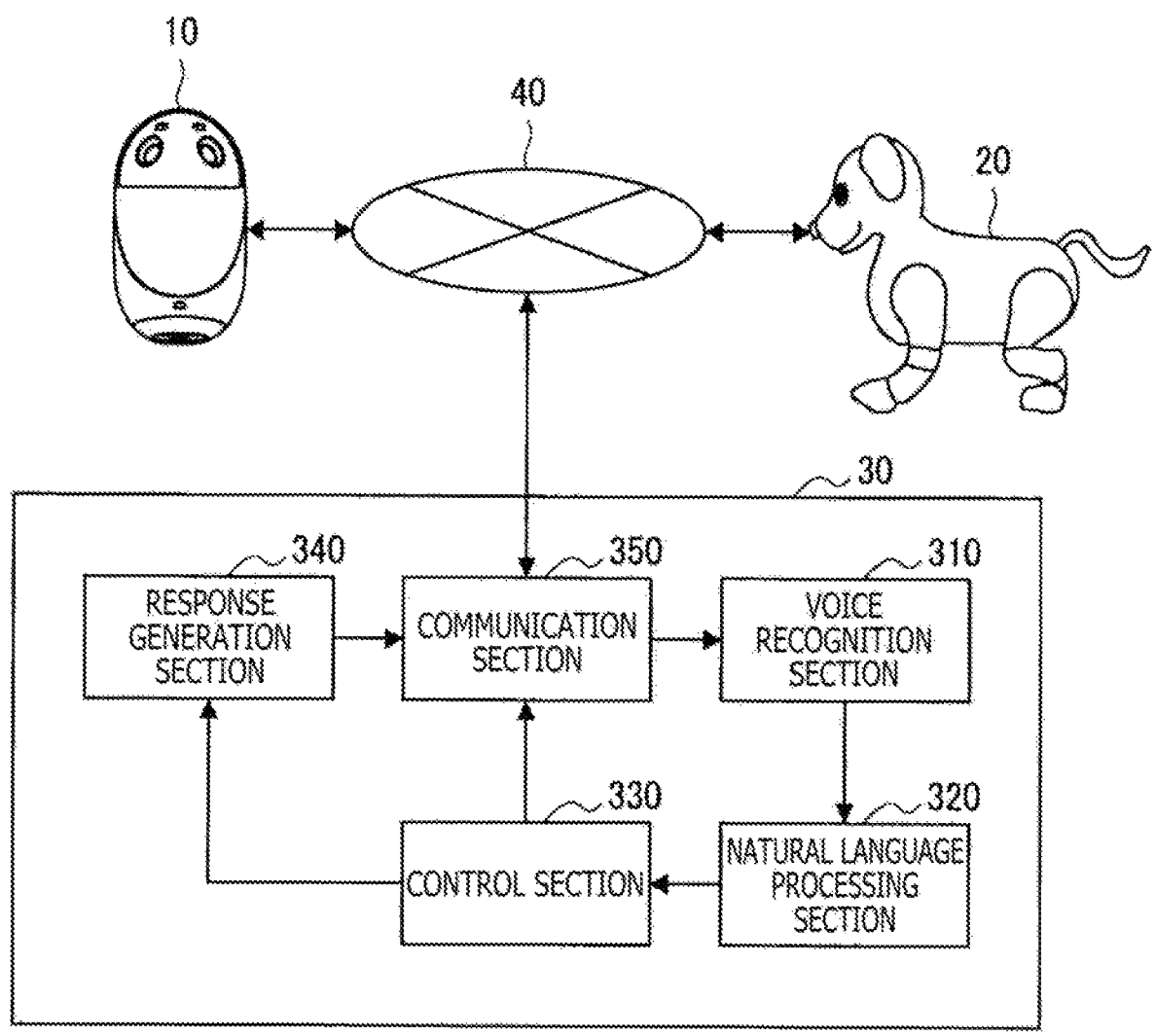
FIG. 4 is a block diagram depicting a functional configuration example of an information processing server 30 according to the embodiment.

Next, a functional configuration example of the information processing server 30 according to the present embodiment will be explained. FIG. 4 is a block diagram depicting a functional configuration example of the information processing server 30 according to the present embodiment. As depicted in FIG. 4, the information processing server 30 according to the present embodiment includes a voice recognition section 310, a natural language processing section 320, a control section 330, a response generation section 340, and a communication section 350.

(Voice Recognition Section 310)

The voice recognition section 310 according to the present embodiment executes a voice recognition process that is based on a speech voice received from the first operation body 10 such that the speech voice is converted to a character string.

(Natural Language Processing Section 320)

The natural language processing section 320 according to the present embodiment executes a natural language comprehending process that is based on the character string generated by the voice recognition section 310 such that an intention of the user speech is extracted.

(Control Section 330)

The control section 330 according to the present embodiment controls an operation of one of the operation bodies and an operation of the other operation body in accordance with a result of a voice recognition process that is based on a voice collected by the one operation body or the environment recognized from sensor information collected by the one operation body. The details of the function of the control section 330 according to the present embodiment will be separately explained later.

(Response Generation Section 340)

The response generation section 340 according to the present embodiment generates response information corresponding to the intention of the user speech extracted by the natural language processing section 320, under control of the control section 330. The response generation section 340 generates a response voice or the like to the user speech, for example.

(Communication Section 350)

The communication section 350 according to the present embodiment performs information communication with the first operation body 10 and the second operation body 20 over the network 40. For example, the communication section 350 receives a speech voice from the first operation body 10. In addition, the communication section 350 transmits, to the second operation body 20, information concerning results of a voice recognition process and a natural language comprehending process based on the speech voice.

The functional configuration of the information processing server 30 according to the present embodiment has been explained so far. It is to be noted that the above-mentioned configuration explained with use of FIG. 4 is one example, and the functional configuration of the information processing server 30 according to the present embodiment is not limited to this example. The information processing server 30 according to the present embodiment can be flexibly modified according to specifications or management.

<<1.6. Details of Functions>>

Next, the details of the functions of the information processing system according to the present embodiment will be explained. As previously explained, the information processing method according to the present embodiment is provided to, in an environment where there are a plurality of operation bodies that each perform an operation in accordance with a voice recognition process, cause each of the operation bodies to perform a more suitable operation by sharing information recognized from information collected by the operation bodies.

To this end, the information processing system according to the present embodiment may include a plurality of types of operation bodies having different functions and characteristics. For example, the information processing system according to the present embodiment can include the above-mentioned first operation body 10 and the above-mentioned second operation body 20.

The first operation body 10 according to the present embodiment is capable of performing an operation in accordance with results of a voice recognition process (hereinafter, also referred to as first voice recognition process) in which a cloud dictionary (hereinafter, also referred to as first dictionary) including an abundance of phrases is used, and a natural language comprehending process, which are executed by the information processing server 30. Compared to the second operation body 20, the first operation body 10 can perform a response operation by recognizing a wider range of phrases and recognizing the intention of a speech more accurately.

In addition, since the first operation body 10 according to the present embodiment travels by using the wheels provided on the bottom part thereof, one of the characteristics of the first operation body 10 is producing a quieter moving sound (operation sound), compared to the second operation body 20 which walks while producing a large servo sound or a large grounding noise.

In addition, since the first operation body 10 according to the present embodiment is expected to be placed on a table, the view point of the first operation body 10 is higher than that of the second operation body 20. The first operation body 10 can recognize a user or an object in a visual field wider than that of the second operation body 20.

Moreover, the first operation body 10 according to the present embodiment can interact with a user by using a language. The first operation body 10 can more reliably transmit information concerning a recognized user speech or a recognized environment.

In contrast, the second operation body 20 according to the present embodiment executes, at a local side, a voice recognition process (hereinafter, also referred to as second voice recognition process) in which a local dictionary (hereinafter, also referred to as second dictionary) including fewer phrases than the cloud dictionary is used, and performs an operation in accordance with a result of the voice recognition process. Accordingly, the second operation body 20 according to the present embodiment can recognize preliminarily registered phrases only, but the computation amount can be efficiently reduced because the number of phrases is suppressed. As a result, a quick response can be made.

In addition, since the second operation body 20 according to the present embodiment walks on a floor, the movement range of the second operation body 20 is wider than that of the first operation body 10. The second operation body 20 can move between a plurality of rooms. Moreover, the second operation body 20 according to the present embodiment can generate an environment map by SLAM, and further, can associate the environment map with the name of a space (e.g. a living room, a kitchen) in accordance with an instruction given by a user.

Thus, the first operation body 10 and the second operation body 20 according to the present embodiment have the respective advantages. Hereinafter, information coordination between the first operation body 10 and the second operation body 20 having the above-mentioned characteristics will be explained with reference to some specific examples.

First, voice recognition result sharing according to the present embodiment will be explained. The control section 330 of the information processing server 30 according to the present embodiment may cause, in accordance with a result of a voice recognition process that is based on a voice collected by one of the operation bodies, another one of the operation bodies to perform an operation corresponding to the voice recognition process result. For example, the control section 330 can control an operation of the second operation body 20 by reporting, to the second operation body 20, a result of a first voice recognition process that is based on a voice collected by the first operation body 10.

FIG. 5 is a diagram for explaining voice recognition result sharing according to the present embodiment. In an example depicted in the upper part of FIG. 5, a user U makes a speech UO1 "That's my boy," which has an intention (good FB) to praise the second operation body 20.

However, in the example depicted in FIG. 5, only a phrase "Good boy" is registered as a phrase corresponding to a category: good FB in the second dictionary 242 included in the second operation body 20. Therefore, the speech UO1 of the user U is difficult for the second operation body 20 to correctly recognize.

On the other hand, "That's my boy" is registered in the first dictionary 322 included in the information processing server 30. Therefore, the information processing server 30 can recognize the speech UO1 with high accuracy through the first voice recognition process, and further, can report the recognition result to the first operation body 10.

Thus, in a case where any phrase corresponding to a user speech is not registered in the second dictionary 242 in the second operation body 20, the control section 330 of the information processing server 30 may cause the second operation body 20 to perform an operation in accordance with the result of the first voice recognition process that is based on the first dictionary 322 and the voice collected by the first operation body 10.

More specifically, the control section 330 according to the present embodiment may extract, from the second dictionary 242, a phrase corresponding to the category of a phrase obtained as the result of the first voice recognition process, and report the extracted phrase to the second operation body 20.

In an example depicted in the lower part of FIG. 5, the control section 330 extracts, from the second dictionary 242, a phrase "Good boy" corresponding to the category: good FB of the phrase "That's my boy" obtained as the result of the first voice recognition process, and reports the phrase "Good boy" to the second operation body 20. As a result of this control, the second operation body 20 simulatively catches the phrase "That's my boy," which the second operation body 20 cannot recognize by itself, so that the second operation body 20 can perform a suitable operation according to the intention of the user U's speech. It is to be noted that the control section 330 may report, to the second operation body 20, information concerning the category of a phrase obtained as the result of the first voice recognition process, in addition to or in place of the phrase.

In addition, in a case where the above-mentioned voice recognition result sharing is carried out, the control section 330 according to the present embodiment may cause one of the operation bodies to perform an operation indicating that a result of a voice recognition process that is based on a voice collected by the one operation body has been reported to another one of the operation bodies.

For example, the control section 330 according to the present embodiment may cause the first operation body 10 to perform an operation indicating that the result of the first voice recognition process that is based on the voice collected by the first operation body 10 has been reported to the second operation body 20. In the example depicted in the lower part of FIG. 5, the control section 330 causes the first operation body 10 to output a system speech SO1 "He praised you" toward the second operation body 20.

Besides the above-mentioned examples, the control section 330 may cause the first operation body 10 to execute a system speech such as "I told him," or a system speech (e.g. a speech using a sound imitating a dog's cry) expressing that the first operation body 10 interprets the user U's speech UO1 for the second operation body 20, for example.

In addition, the control section 330 may cause the second operation body, which is a sharing destination of the voice recognition result, also to perform an operation indicating that the sharing is completed. In a case where the result of the first voice recognition has been reported in the above-mentioned manner, the control section 330 may cause the second operation body 20 to output a larger sound or conduct lager motion than in the normal state, for example. In addition, the control section 330 may cause the second operation body 20 to make a gesture to indicate that the second operation body 20 is embarrassed about having failed to catch the speech by itself, or to make a gesture to express appreciation to the first operation body 10.

As a result of this control, expressions in which, like real living things, the first operation body 10 and the second operation body 20 communicate with each other can be implemented. Accordingly, it is expected that a user interest is further attracted.

The voice recognition result sharing according to the present embodiment has been explained so far. It is to be noted that the case where the main control part of the sharing is the control section 330 of the information processing server 30 has been explained above as an example, but the control section 150 of the first operation body 10 may serve as the main control part of the voice recognition result sharing. The control section 150 can receive a result of a first voice recognition process from the information processing server 30, and then, reports the result to the second operation body 20 through short-distance wireless communication or the like.

Next, a process flow of the voice recognition result sharing according to the present embodiment will be explained. FIG. 6A is a flowchart depicting an operation flow of the first operation body 10 and the information processing server 30 in the voice recognition result sharing according to the embodiment.

With reference to FIG. 6A, the first operation body 10 first performs an autonomous operation in accordance with a recognized environment (S1101).

Next, the control section 150 or the control section 330 which serves as the main control part determines whether or not a phrase of a category corresponding to a phrase recognized by a first voice recognition process is included in the second dictionary 242 included in the second operation body 20 (S1102).

In a case where a corresponding phrase is included in the second dictionary 242 (YES in S1102), the main control part subsequently determines whether or not the speech is given to the second operation body 20 (S1103). The control section 150 or the control section 330 can make the above determination on the basis of that the trigger detection section 140 of the first operation body 10 detects that the user's face is directed toward the second operation body 20, that the second operation body 20 detects a user's touch, that the last speech includes the name of the second operation body, or the like.

In a case where the speech is given to the second operation body 20 (YES in S1103), the main control part transmits the corresponding phrase to the second operation body (S1104).

On the other hand, in a case where no corresponding phrase is included in the second dictionary 242 (NO in S1102) or in a case where the speech is not given to the second operation body (NO in S1103), the first operation body 10 returns to step S1101.

Figure 6B:
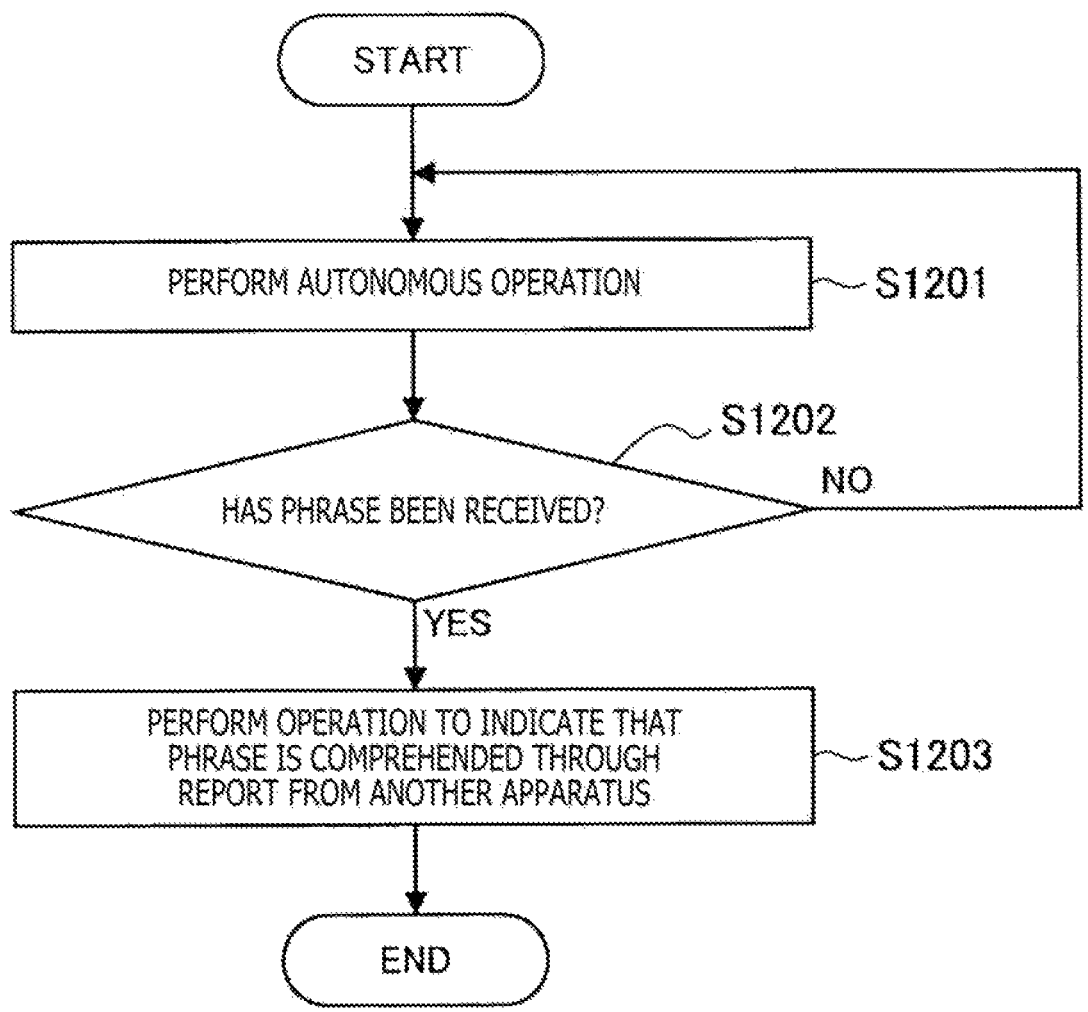
FIG. 6B is a flowchart depicting an operation flow of the second operation body 20 in the voice recognition result sharing according to the embodiment.

FIG. 6B is a flowchart depicting an operation flow of the second operation body 20 in the voice recognition result sharing according to the present embodiment.

With reference to FIG. 6B, the second operation body 20 first performs an autonomous operation in accordance with a recognized environment (S1201).

Next, the control section 250 of the second operation body 20 determines whether or not a phrase has been received from the first operation body 10 or the information processing server 30 (S1202).

In a case where a phrase has been received (YES in S1202), the control section 250 causes the first operation body 10 to perform an operation indicating that the phrase has been comprehended by a report from a separate apparatus (S1203).

In a case where no phrase has been received (NO in S1202), the second operation body 20 returns to step S1201.

The process flow of the voice recognition result sharing according to the present embodiment has been explained so far. Next, an explanation will be given of updating of the second dictionary in accordance with a log of first voice recognition process results according to the present embodiment.

As explained above, since the number of phrases registered in the second dictionary 242 is suppressed, the computation amount of the second operation body 20 according to the present embodiment is reduced so that the second operation body 20 can make a quick response. On the other hand, in a case where a set of phrases that are usually used by a user deviates from a set of phrases registered in the second dictionary 242, there is a probability that a user experience is impaired because the recognition accuracy is deteriorated. For this reason, the information processing system according to the present embodiment may have a mechanism of regularly or irregularly replacing the set of phrases registered in the second dictionary 242.

FIG. 7 is a diagram for explaining replacement of a set of phrases registered in the second dictionary 242 according to the present embodiment. It is to be noted that FIG. 7 is a block diagram focusing on, among the sections in the information processing system, the function of replacing a set of phrases, and some of the sections in the information processing system are omitted.

To realizing replacement of phrases registered in the second dictionary 242, the second operation body 20 according to the present embodiment may include an evaluation section 735, a dictionary updating section 740, and a candidate dictionary 745 which is separated from the second dictionary 242.

The evaluation section 735 according to the present embodiment evaluates a user speech record on the basis of accumulated individual intelligence. Here, individual intelligence refers to knowledge based on experiences unique to the second operation body 20. Specifically, the individual intelligence according to the present embodiment includes a speech log 720 obtained by recognition by the recognition section 240, and a speech-time status log 730 obtained by recording the speech-time statuses.

The evaluation section 735 according to the present embodiment may evaluate that the speech record of a phrase is higher when the number of times the phrase has been recognized is greater. Meanwhile, in order to handle erroneous recognition or coming out of a non-voice sound at the recognition section 240, the evaluation section 735 may comprehensively evaluate a speech record on the basis of the speech-time status etc. Erroneous recognition refers to a situation where, in response to an actual user speech "Good morning," the recognition section 240 outputs a recognition result other than "Good morning" (e.g. "Good night"). Further, coming out of a non-voice sound refers to a situation where, in response to a sound other than a user speech (e.g. daily life noise), a recognition result is outputted. For example, in response to a closing door sound, "bang" is outputted as a recognition result.

In addition, under control of the control section 250, the dictionary updating section 740 according to the present embodiment updates the second dictionary 242 and the candidate dictionary 745 in accordance with the speech record evaluated by the evaluation section 735. Here, in the candidate dictionary 745 according to the present embodiment, a phrase to be replaced or added to the second dictionary 242 is registered. With the dictionary updating section 740, a phrase the speech record of which has a low evaluation can be deleted from the second dictionary 242, or can be transferred to the candidate dictionary 745, and a high priority phrase registered in the candidate dictionary 745 can be registered into the second dictionary 242 in place of the deleted phrase, for example.

In addition, the dictionary updating section 740 according to the present embodiment may have a function of acquiring a non-registered phrase from the information processing server 30 and additionally registering the phrase into the second dictionary 242 or the candidate dictionary 745. For example, the dictionary updating section 740 may acquire a correlated phrase 931, a trend phrase 932, a seasonal phrase 933, a generational phrase 934, a dialect 935, etc. and additionally register the acquired phrase into the second dictionary 242 or the candidate dictionary 745. When doing so, the dictionary updating section 740 may delete a phrase the speech record of which has a low evaluation from the second dictionary 242 or the candidate dictionary 745 in order to prevent the number of phrases from exceeding a specified number.

It is to be noted that the correlated phrase 931 refers to a phrase that is spoken subsequently to a certain phrase, that is, refers to a phrase having a high correlation with another phrase or function. The correlated phrase 931 may be acquired through analysis of collective intelligence 915, which is obtained by integrally storing the speech logs 720 or the speech-time status logs 730 recorded by a plurality of the second operation bodies 20, for example.

The trend phrase 932 refers to a phrase that becomes a trend in the society. The seasonal phrase 933 refers to a phrase that is appropriate to the season. The generational phrase 934 refers to a frequently used phrase for each generation.

The configuration, of the second operation body 20, related to updating of the second dictionary 242 has been explained so far. With the above configuration, the second dictionary 242 can be updated, as appropriate, on the basis of a user speech record. Accordingly, a deviation between a set of phrases that are used by the user and a set of phrases registered in the second dictionary 242 can be effectively suppressed. Regarding the details of the above-mentioned dictionary updating, refer to Japanese Patent Application No. 2018-124856, which is the previous application filed by the applicant of the present disclosure.

On the other hand, in a case where a user speech record is evaluated only on the basis of the speech log 720 or the speech-time status log 730 stored in the second operation body 20, storing information necessary for analysis takes much time in some cases. To address such a cause, the control section 250 according to the present embodiment may cause the dictionary updating section 740 to execute dictionary updating by additionally using a recognition log 324 regarding results of the first voice recognition process based on voices collected by the first operation body 10. That is, on the basis of the recognition log 324, the control section 250 according to the present embodiment can control replacement in the second dictionary 242 or the candidate dictionary 745.

As a result of this control, a user speech record can be evaluated with higher accuracy on the basis of a phrase recognized with high accuracy through the first voice recognition process and the number of times of the recognition, the accuracy of the dictionary updating can be improved, and further, log storage necessary for evaluation can be minimized.

Figure 8:
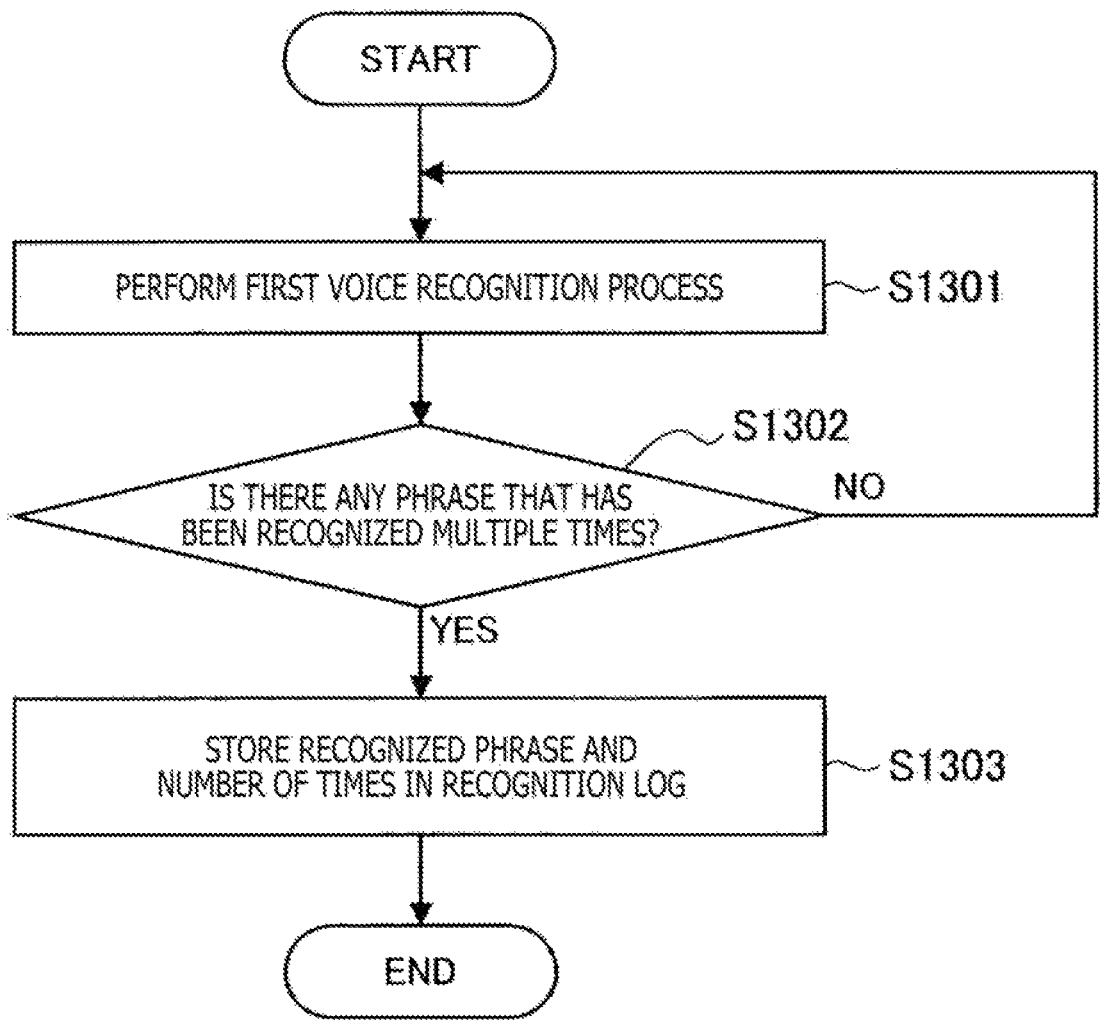
FIG. 8 is a flowchart depicting a flow in which the information processing server 30 stores a recognition log according to the embodiment.

FIG. 8 is a flowchart depicting a flow in which the information processing server 30 stores a recognition log according to the present embodiment.

With reference to FIG. 8, first, the voice recognition section 310 executes the first voice recognition process in accordance with voice data received from the first operation body 10 (S1301).

Next, the voice recognition section 310 determines whether or not there is any phrase that has been recognized a plurality of times in the first voice recognition process in step S1301 (S1302).

Here, in a case there is a phrase that has been recognized a plurality of times (YES in S1302), the voice recognition section 310 stores the recognized phrase and the number of times of the recognition in the recognition log 324 (S1303).

In a case where there is no phrase that has been recognized a plurality of times (NO in S1302), the information processing server 30 returns to step S1301.

Figure 9:
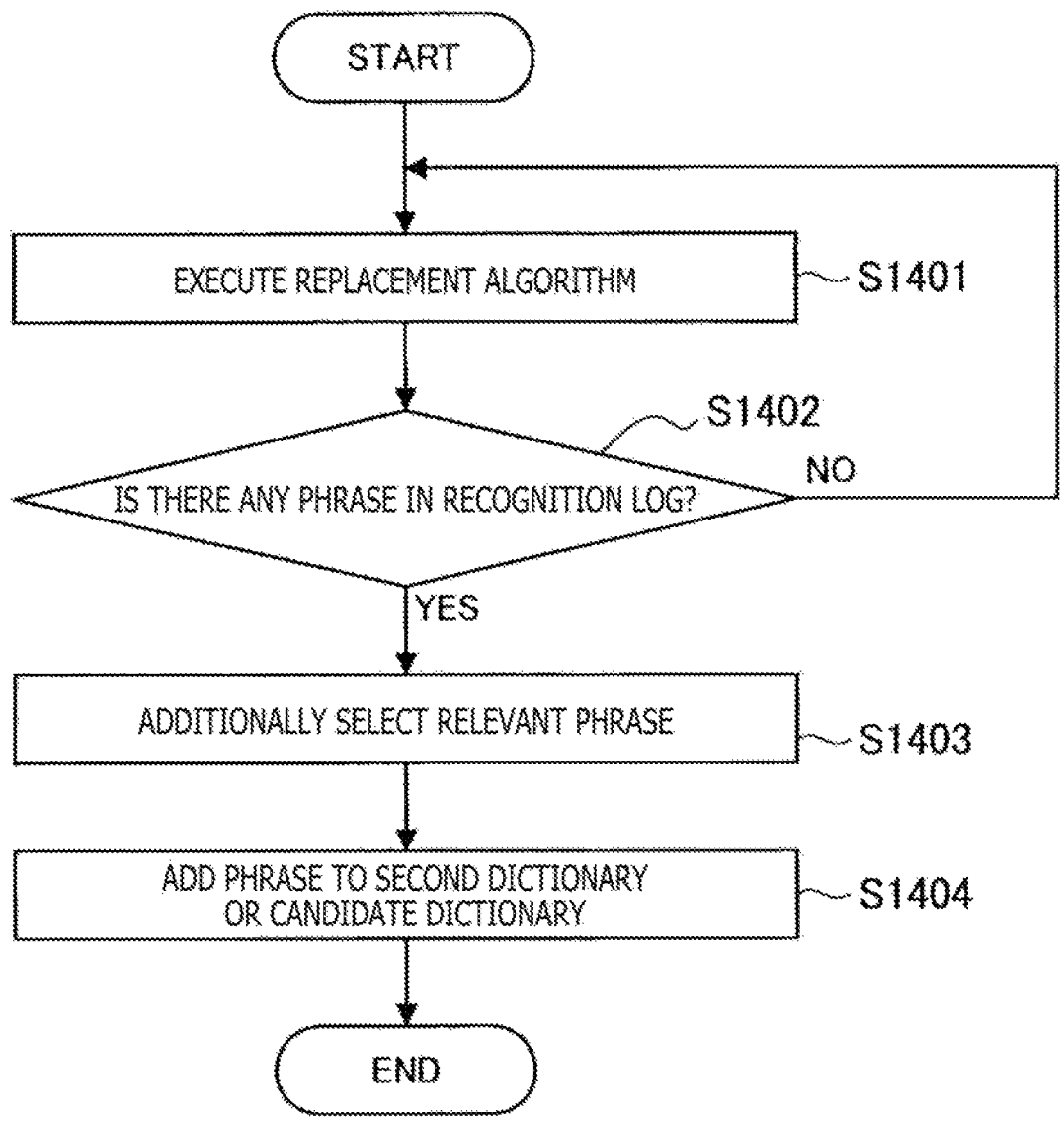
FIG. 9 is a flowchart of a flow in which the second operation body 20 updates a dictionary according to the embodiment.

FIG. 9 is a flowchart of a flow in which the second operation body 20 updates a dictionary according to the present embodiment.

With reference to FIG. 9, first, the control section 250 causes the dictionary updating section 740 to execute a replacement algorithm regarding dictionary updating (S1401).

Next, the control section 250 determines whether or not there is any phrase in the recognition log 324 stored in the information processing server 30 (S1402).

In a case where there is a phrase in the recognition log 324 (YES in S1402), the control section 250 causes the dictionary updating section 740 to additionally select another phrase that is relevant to the phrase in the recognition log 324 (S1403). On the basis of the profile of the phrase registered in the recognition log 324, the dictionary updating section 740 may select a phrase to be additionally registered, from the correlated phrase 931, the trend phrase 932, the seasonal phrase 933, the generational phrase 934, the dialect 935, and the like.

Next, the control section 250 controls the dictionary updating section 740 to add the phrase acquired from the recognition log 324 and the relevant phrase into the second dictionary 242 or the candidate dictionary 745 (S1404).

The dictionary updating according to the present embodiment has been explained so far. It is to be noted that the example in which the control section 250 of the second operation body 20 serves as the main control part of the dictionary updating, but the control section 330 of the information processing server 30 may serve as the main control part of the dictionary updating according to the present embodiment.

Next, operation control based on recognition environment sharing according to the present embodiment will be explained. In the information processing method according to the present embodiment, a recognition environment may be shared by a plurality of operation bodies in accordance with not only a voice recognition result but also information collected by the operation bodies, and further, may be used to control operations of the operation bodies.

For example, in a case where a voice recognition environment regarding one operation body can become a factor to deteriorate the accuracy of a voice recognition process, the control section 330 according to the present embodiment may control an operation of another operation body such that a voice recognition environment regarding the other operation body is improved.

Here, the voice recognition environment refers to one of various environments that affect the voice recognition accuracy. Examples of the voice recognition environment may include an operation state of an operation body. For example, in a case where an operation body is performing an operation with a relatively large operation sound such as a servo sound or a grounding sound, the operation sound may hinder collection of user speech voices so that the voice recognition accuracy is deteriorated.

To address this case, in accordance with the operation state of one operation body, the control section 330 according to the present embodiment may control an operation of another operation body. More specifically, in a case where the one operation body is performing an operation with a relatively large operation sound, the control section 330 according to the present embodiment performs control to reduce the operation sound of the other operation body.

Figure 10:
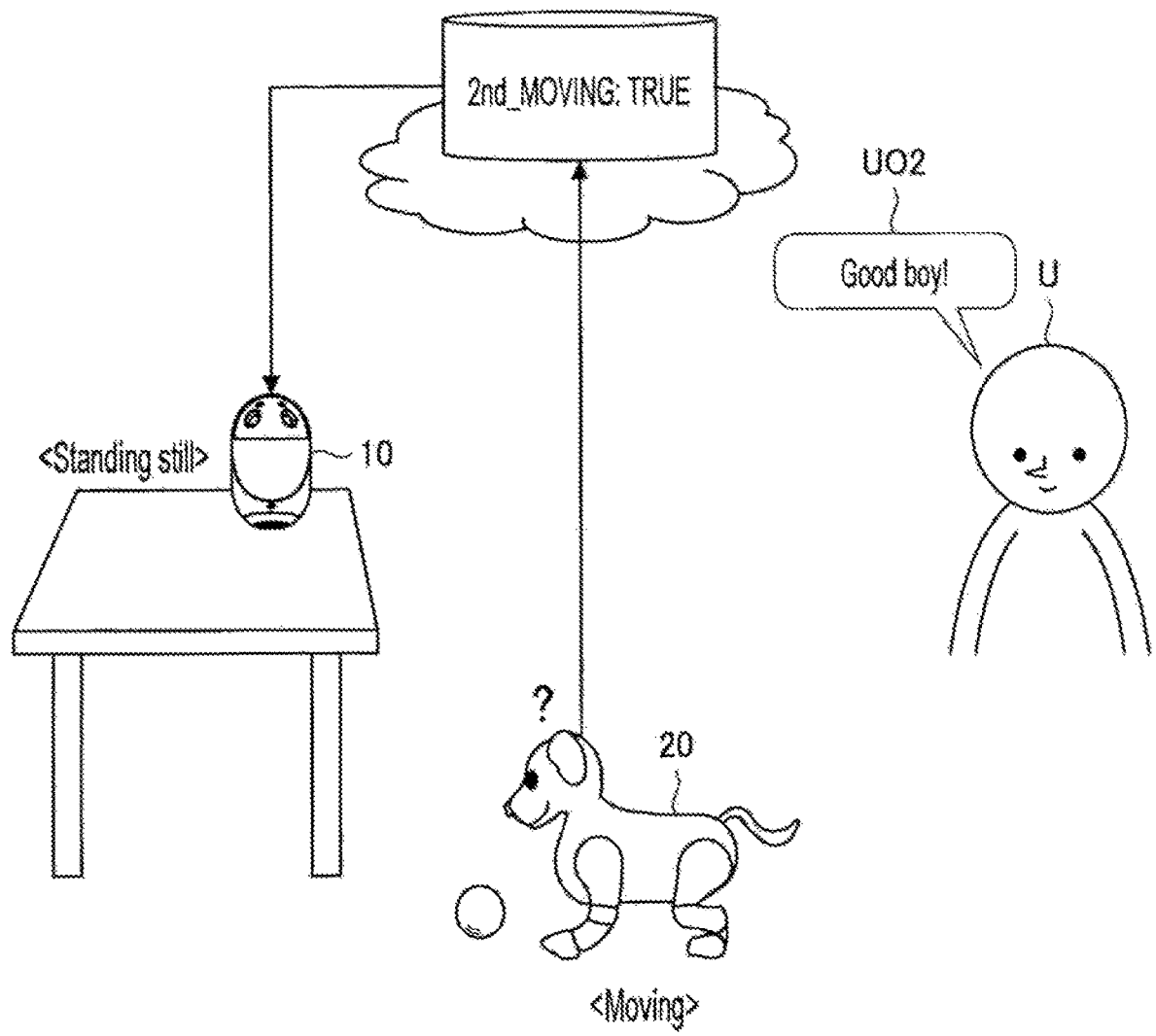
FIG. 10 is a diagram for explaining operation control which is performed, in accordance with an operation state of one operation body, on another operation body according to the embodiment.

FIG. 10 is a diagram for explaining operation control which is performed, in accordance with an operation state of one operation body, on another operation body according to the present embodiment. In one example depicted in FIG. 10, in a state where the second operation body 20 is playing with a ball, the user U makes a speech UO2. In this case, there is a possibility that the operation sound of the second operation body 20 hinders the second operation body 20 itself from accurately collecting the sound of the speech UO2.

In this case, in accordance with an operation status (2nd_MOVING: TRUE) uploaded from the second operation body 20, the control section 330 of the information processing server 30 according to the present embodiment may predict deterioration of the accuracy of the second voice recognition process at the second operation body 20. In addition, the control section 330 performs control to reduce the operation sound of the first operation body 10 so as to allow the first operation body 10 to accurately collect the voice of the speech UO2. The control section 330 may cause the first operation body 10 to stand still, for example.

As a result of this control, in place of the second operation body 20 that is performing the operation, the first operation body 10 can collect the voice of the speech UO2 made by the user U, and further, can report a result of the first voice recognition process to the second operation body 20. Accordingly, even when the second operation body 20 is performing an operation, an operation of replying to the speech UO2 can be performed.

FIG. 11 is a flowchart depicting a flow of operation control which is performed, in accordance with an operation state of one operation body, on another operation body according to the present embodiment.

With reference to FIG. 11, first, in a state where the first operation body 10 is performing an autonomous operation (S1501), the control section 330 determines whether or not the second operation body 20 is performing an operation (S1502). As described above, the control section 330 can make the determination on the basis of the operation status uploaded from the second operation body 20.

In a case where the second operation body 20 is performing an operation (YES in S1502), the control section 330 performs control to reduce the operation sound of the first operation body 10 (S1503).

Next, the control section 330 determines whether or not a phrase of a category corresponding to a phrase recognized by the first voice recognition process is included in the second dictionary 242 included in the second operation body 20 (S1504).

In a case where a corresponding phrase is included in the second dictionary 242 (YES in S1504), the control section 330 reports the corresponding phrase to the second operation body 20 (S1505). It is to be noted that the control section 330 may report the corresponding phrase to the second operation body 20 only in a case where the speech is given to the second operation body 20, as in the case of FIG. 6A. Also, the second operation body 20 may execute a subsequent process in accordance with the flow depicted in FIG. 6B. Furthermore, the case where the main control part is the control section 330 of the information processing server 30 has been explained, but the control section 150 of the first operation body 10 may serve as the main control part.

Next, another type of voice recognition environment sharing and operation control of operation bodies according to the present embodiment will be explained. As previously explained, the voice recognition environments in the present embodiment include the operation state of an operation body. However, the voice recognition environment in the present embodiment may include an environment regarding coming out of a non-voice sound or identification of a speaking person, that is, may include a noise source/speaking person recognition (identification) result.

Figure 12A:
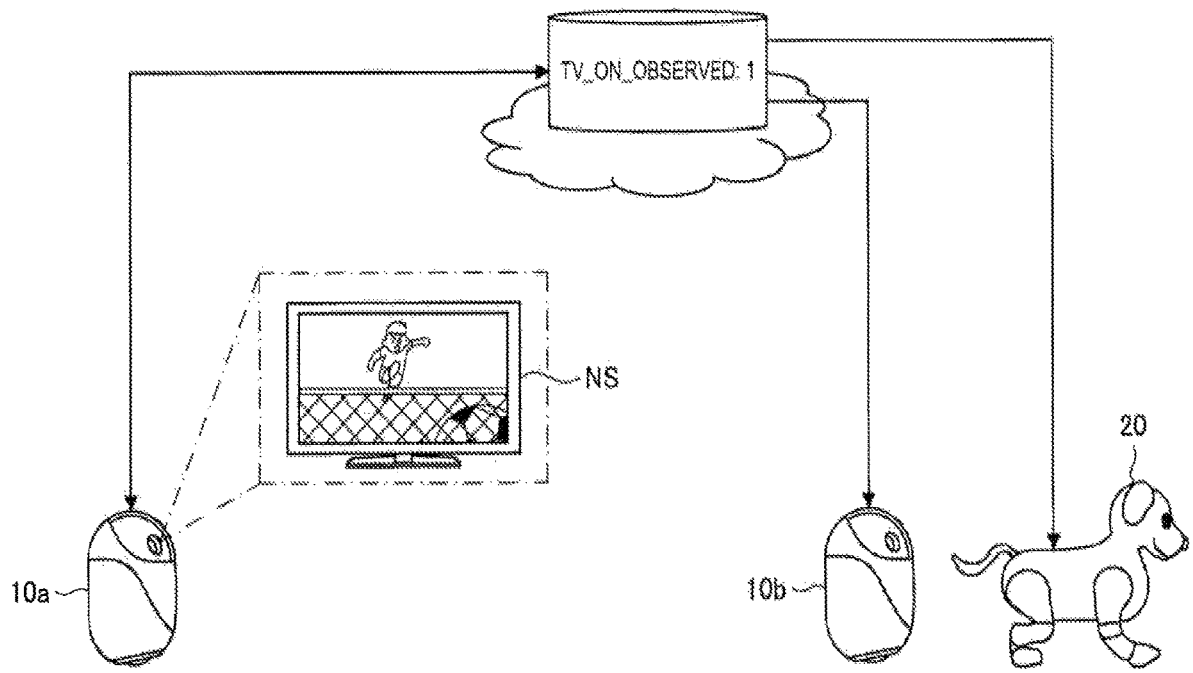
FIG. 12A is a diagram for explaining noise source recognition result sharing according to the embodiment.

FIG. 12A is a diagram for explaining noise source recognition result sharing according to the present embodiment. FIG. 12A depicts a situation in which first operation bodies 10a and 10b, and the second operation body 20 are in the same room, and only the first operation body 10a has recognized that a sound is outputted from a noise source NS which is a television apparatus.

In this situation, there is a possibility that the first operation body 10b and the second operation body 20 misrecognize that the sound outputted from the noise source NS is a user speech voice, and then, execute a voice recognition process.

In order to avoid this, the first operation body 10a may upload information regarding the recognized noise source NS to the information processing server 30. In addition, the control section 330 of the information processing server 30 may perform control to prevent execution of any voice recognition process indirectly or directly by reporting the information regarding the noise source NS uploaded from the first operation body 10a, to the first operation body 10b and the second operation body 20.

Figure 12B:
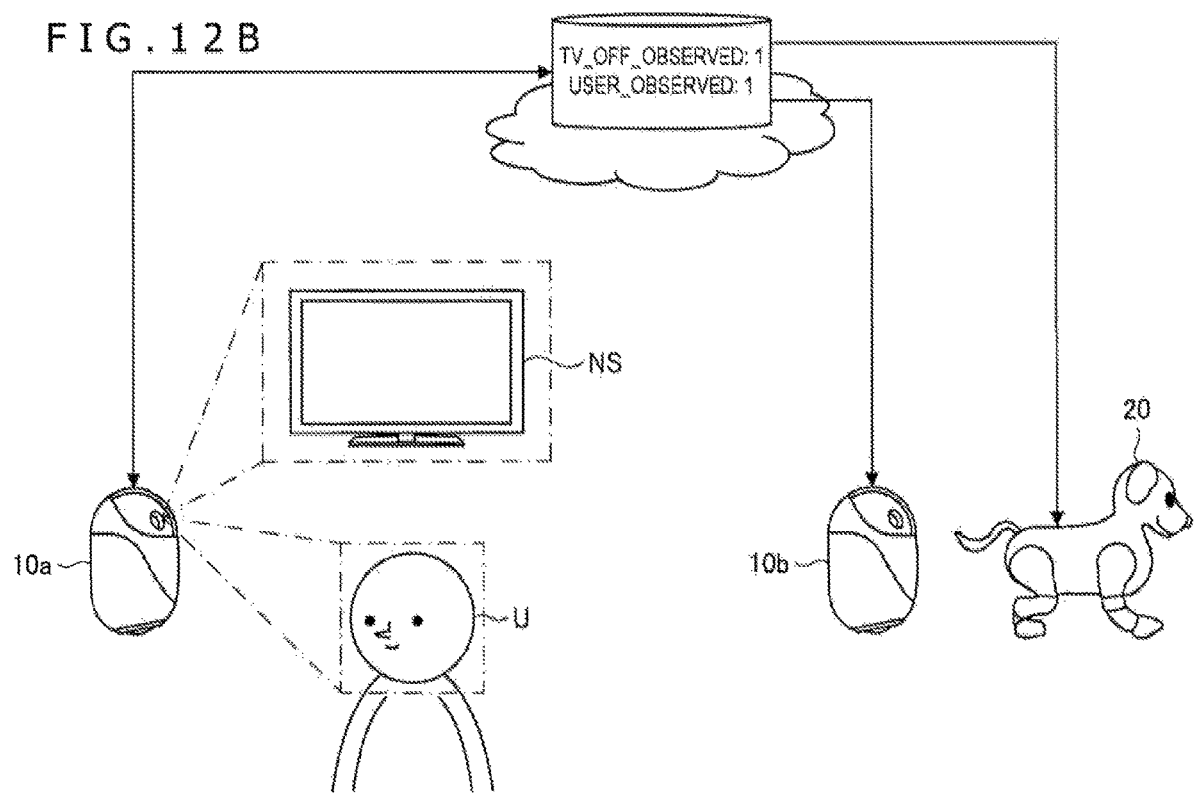
FIG. 12B is a diagram for explaining speaker recognition result sharing according to the embodiment.

FIG. 12B is a diagram for explaining speaker recognition result sharing according to the present embodiment. FIG. 12B depicts a situation in which the first operation bodies 10a and 10b, and the second operation body 20 are in the same room, and only the first operation body 10a has recognized the user U, and that no sound is outputted from the noise source NS which is a television apparatus.

In this situation, if the first operation body 10b and the second operation body 20 detect a voice, the voice is highly likely to be a speech voice of the user U.

Therefore, by reporting the information regarding the user U and the noise source NS uploaded from the first operation body 10a, to the first operation body 10b and the second operation body 20, the control section 330 of the information processing server 30 may perform control indirectly or directly such that, upon detection of a voice, a voice recognition process is executed.

As explains so far, the control section 330 according to the present embodiment can report information regarding a noise source or a speaking person recognized from sensor information collected by one of the operation bodies, to another one of the operation bodies, and control whether or not to execute a voice recognition process in the other operation body.

It is to be noted that the control section 330 does not necessarily serve as the main control part of the noise sound/speaking person-related information sharing. The main control part of the sharing may be an operation body to be a sharing source (the first operation body 10 or the second operation body), and information may be shared directly with a sharing destination operation body without using the information processing server 30.

Figure 13A:
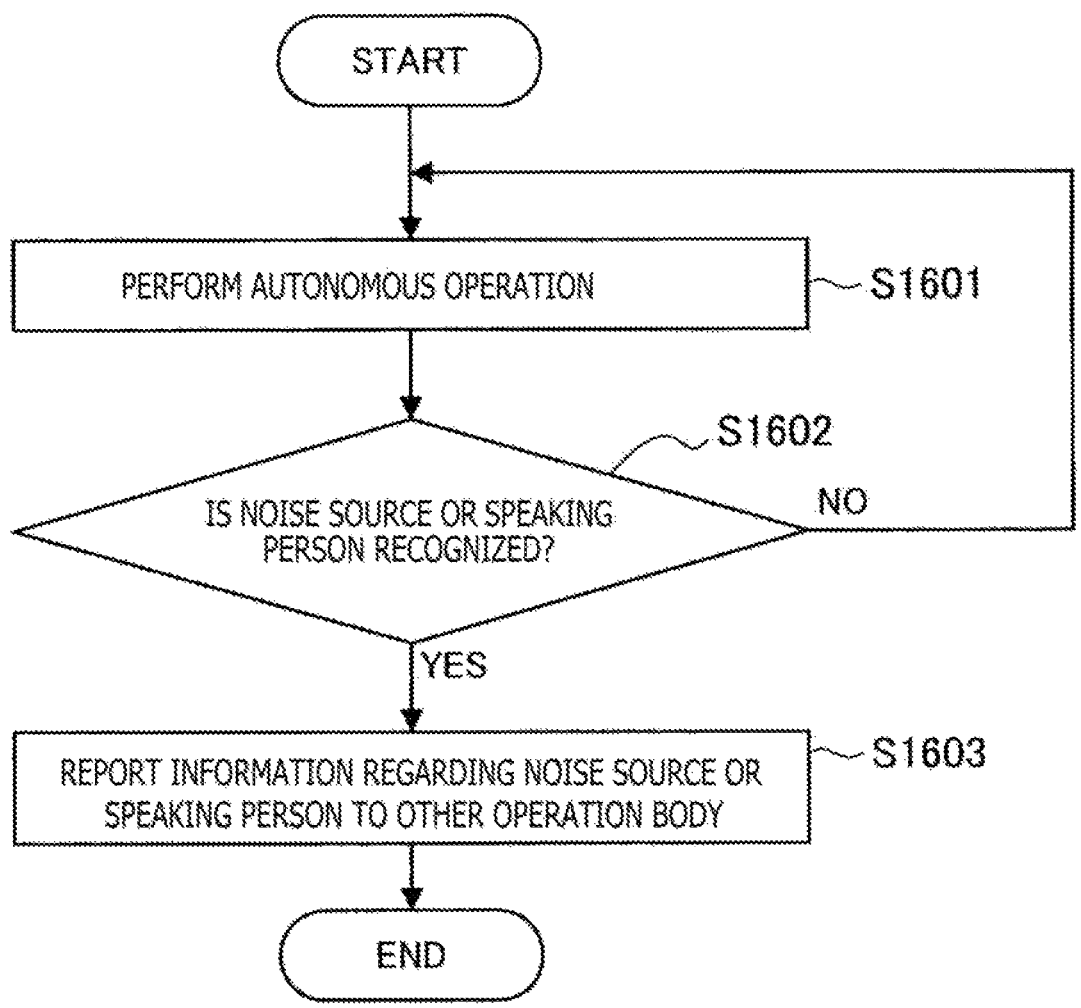
FIG. 13A is a flowchart depicting an operation flow of a sharing source in noise source/speaking person-related information sharing according to the embodiment.

FIG. 13A is a flowchart depicting an operation flow of a sharing source in the noise source/speaking person-related information sharing according to the present embodiment.

With reference to FIG. 13A, the operation body to be a sharing source first performs an autonomous operation (S1601).

Then, in a case where the operation body to be a sharing source recognizes a noise source or a speaking person (YES in S1602), the operation body to be a sharing source reports information regarding the recognized noise source or the recognized speaking person to another operation body (S1603).

FIG. 13B is a flowchart depicting an operation flow of a sharing destination in the noise source/speaking person-related information sharing according to the present embodiment.

With reference to FIG. 13B, the sharing destination operation body first performs an autonomous operation (S1701).

Then, in a case where a voice is detected (YES in S1702), the sharing destination operation body subsequently determines whether or not information regarding a noise source or a speaking person is shared by another operation body (S1703).

In a case where information regarding a noise source or a speaking person is shared by another operation body (YES in S1703), the sharing destination operation body performs an operation according to the shared information (S1704). For example, in an environment including many noise sources, the sharing destination operation body may make a speech "It's somewhat noisy. Let me see your face." to increase the possibility of identifying a user.

By the information processing method according to the present embodiment explained above, an environment recognized by one operation body is reported to another operation body so that the sharing destination operation body can perform a more suitable operation according to the environment.

It is to be noted that the above-mentioned environment sharing may be used for an active action of an operation body toward a user. For example, one of the characteristics of the first operation body 10 according to the present embodiment is actively talking to a user, in addition to replying to a user speech, such that active interaction is implemented. In addition, one of the characteristics of the second operation body 20 according to the present embodiment is conducting an active action toward a user such that active interaction is implemented.

To achieve these characteristics in the information processing method according to the present embodiment, a recognized environment may be shared by a plurality of operation bodies so that the frequency of conducting an active action can be effectively increased.

Figure 14:
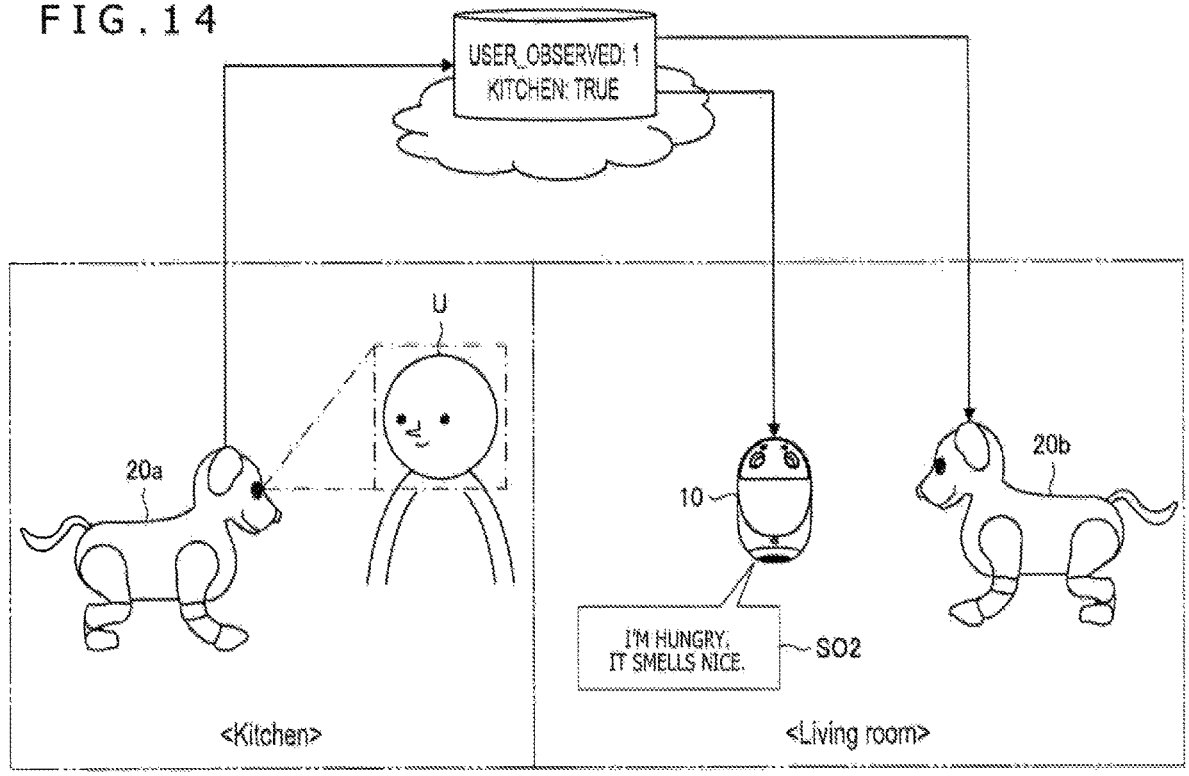
FIG. 14 is a diagram for explaining environment sharing to be an active action trigger according to the embodiment.

FIG. 14 is a diagram for explaining environment sharing to be an active action trigger according to the present embodiment. FIG. 14 depicts a situation in which the user U in a kitchen is identified by a second operation body 20a in the kitchen.

Then, the second operation body 20a uploads information indicating the user U is identified in the kitchen, to the information processing server 30. Further, the control section 330 of the information processing server 30 may indirectly or directly control each of the first operation body 10 and a second operation body 20b in a living room to conduct an active action toward the user, by reporting the information uploaded from the second operation body 20a to the first operation body 10 and the second operation body 20b.

For example, the control section 330 may cause the first operation body 10 to make a system speech SO3 implying that the first operation body 10 grasps the presence of the user U in the kitchen. In addition, for example, the control section 330 may control the second operation body 20b to move to the kitchen, for example.

As explained so far, in accordance with an environment recognized from sensor information collected by one of the operation bodies, the control section 330 according to the present embodiment may cause another one of the operation bodies to conduct an active action toward the user. In addition, in a case where a sharing destination operation body is capable of making a speech, the control section 330 may cause the sharing destination operation body to make an active speech according to the environment.

As a result of this control, each operation body can recognize events more than environments that are recognized from sensor information collected by the operation body. Accordingly, a more active action can be conducted toward the user so that the user experience is improved.

It is to be noted that, as in the noise source/speaking person-related information sharing, the main control part may be an operation body to be a sharing source (the first operation body 10 or the second operation body), and the information may be reported directly to the sharing destination operation body without using the information processing server 30.

Figure 15A:
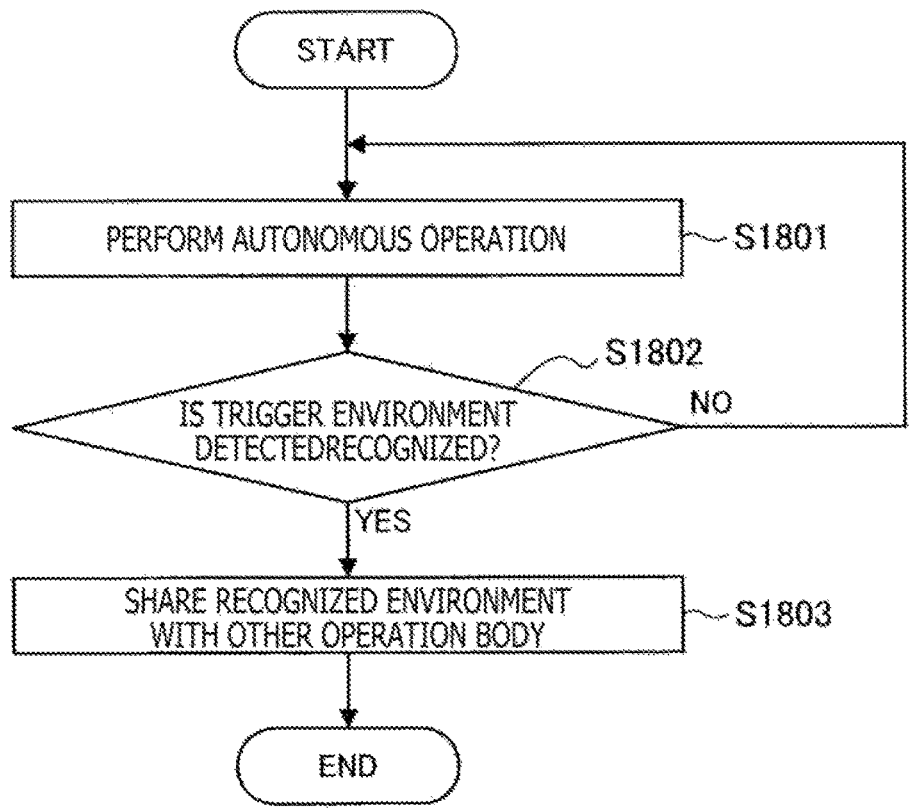
FIG. 15A is a flowchart depicting an operation flow of a sharing source in environment sharing to be an active action trigger according to the embodiment.

FIG. 15A is a flowchart depicting an operation flow of a sharing source in the environment sharing to be an active action trigger according to the present embodiment.

With reference to FIG. 15A, the operation body to be a sharing source first performs an autonomous operation (S1801).

Then, in a case where the operation body to be a sharing source recognizes an environment (also referred to as trigger environment) that is a trigger of an active action (YES in S1802), the operation body to be a sharing source reports information regarding the recognized environment to another operation body (S1803). Examples of the above environment include the location or an action of a user or another person, weather recognition, and environmental sound recognition.

Figure 15B:
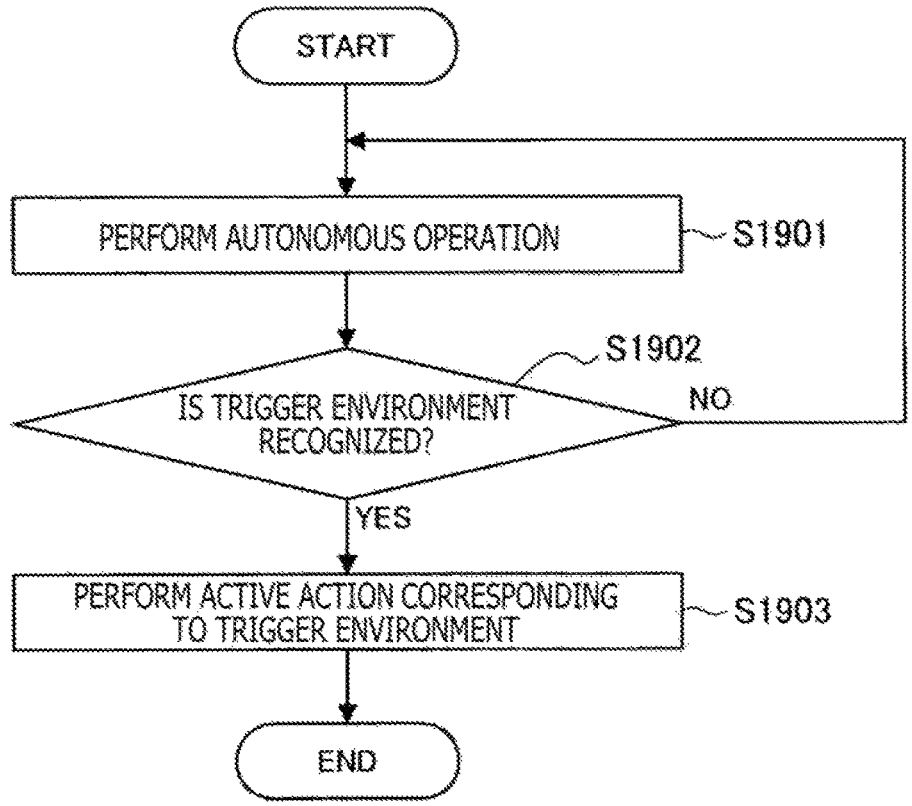
FIG. 15B is a flowchart depicting an operation flow of a sharing destination in environment sharing to be an active action trigger according to the embodiment.

On the other hand, FIG. 15B is a flowchart depicting an operation flow of a sharing destination in the environment sharing to be an active action trigger according to the present embodiment.

With reference to FIG. 15B, the sharing destination operation body first performs an autonomous operation (S1901).

Then, in a case where the trigger environment is shared by another operation body (YES in S1902), the sharing destination operation body conducts an active action according to the shared environment (S1903).

In the information processing method according to the present embodiment as explained so far, an environment recognized by a certain operation body is reported to another operation body. Accordingly, the sharing destination operation body can conduct an active action according to the environment.

It is to be noted that the first operation body 10 according to the present embodiment can interact with a user by switching a plurality of interaction engines in accordance with a recognized environment or a shared environment.

Figure 16:
FIG. 16 is a diagram for explaining interaction engine switching according to the embodiment.

FIG. 16 is a diagram for explaining interaction engine switching according to the present embodiment. FIG. 16 depicts the types of engines that are used for respective environments. The first operation body 10 according to the present embodiment can implement richer interaction by switching an engine among four different engines regarding scenario interaction, situation interaction, knowledge interaction, and light conversation interaction, for example.

Scenario interaction may be interaction for generating a speech corresponding to an environment matching a preset condition, on the basis of a scenario including a pair of a preset condition and a fixed-form speech.

Situation interaction may be interaction for generating a speech to explain a recognized situation (environment) by using a knowledge database.

Knowledge interaction may be interaction for generating a speech by extracting, on the basis of a phrase included in a user speech or a phrase inferred from an environment, another necessary phrase from the knowledge database.

Light conversation interaction may be interaction for generating a speech, in response to a free speech the domain of which is undetermined, by using a machine learning method or the like, or for generating a speech by extracting a proper fixed-form text from a speech text database.

It is to be noted that, if a plurality of engines is applicable according to FIG. 16, an engine having the highest priority level may be used. In a case where speech generation is tried with the engine having the highest priority level but generation of a proper speech fails, an engine having the second highest priority level may be used to try speech generation.

For example, in a case of finding a person and talking to the person, the first operation body 10 can make a speech "Hi" or "Long time no see" by using the scenario interaction engine or the situation interaction engine.

In a case where a person has disappeared, the first operation body 10 can make a speech "Oh, where are you, Taro?", for example, by using the situation interaction engine.

In a case where a particular object is found, the first operation body 10 can make a speech "There's a ball", for example, by using the situation interaction engine.

In a case of asking a surrounding person a question, the first operation body 10 can make a speech "By the way, what are you interested in?", for example, by using the scenario interaction engine.

In a case where an environment that the first operation body 10 is familiar with is recognized, the first operation body 10 can make a speech "It's raining. I have to take an umbrella." or "The meeting is being held. I'll try to be quiet.", for example, by using the situation interaction engine or the knowledge interaction engine.

In addition, when obtaining new information such as topical news from the outside, the first operation body 10 can make a speech "A delay has occurred in ABC station," by using the intelligence interaction engine.

In a case where the first operation body 10 has overheard someone's talk, the first operation body 10 can make a speech "I heard about cake. I like chocolate cake.", for example, by using the knowledge interaction engine or the light conversation interaction engine.

The interaction engine switching according to the present embodiment has been explained above. According to such interaction engine switching, a more proper and richer interaction can be implemented.

Next, integration of voice recognition results according to the present embodiment will be explained. Sharing a result of a voice recognition process that is based on a voice collected by a certain operation body, with another operation body has been previously described. However, in the information processing method according to the present embodiment, a plurality of voice recognition process results based on respective voices collected by a plurality of operation bodies may be integrally determined to decide a single integration recognition result.

Figure 17A:
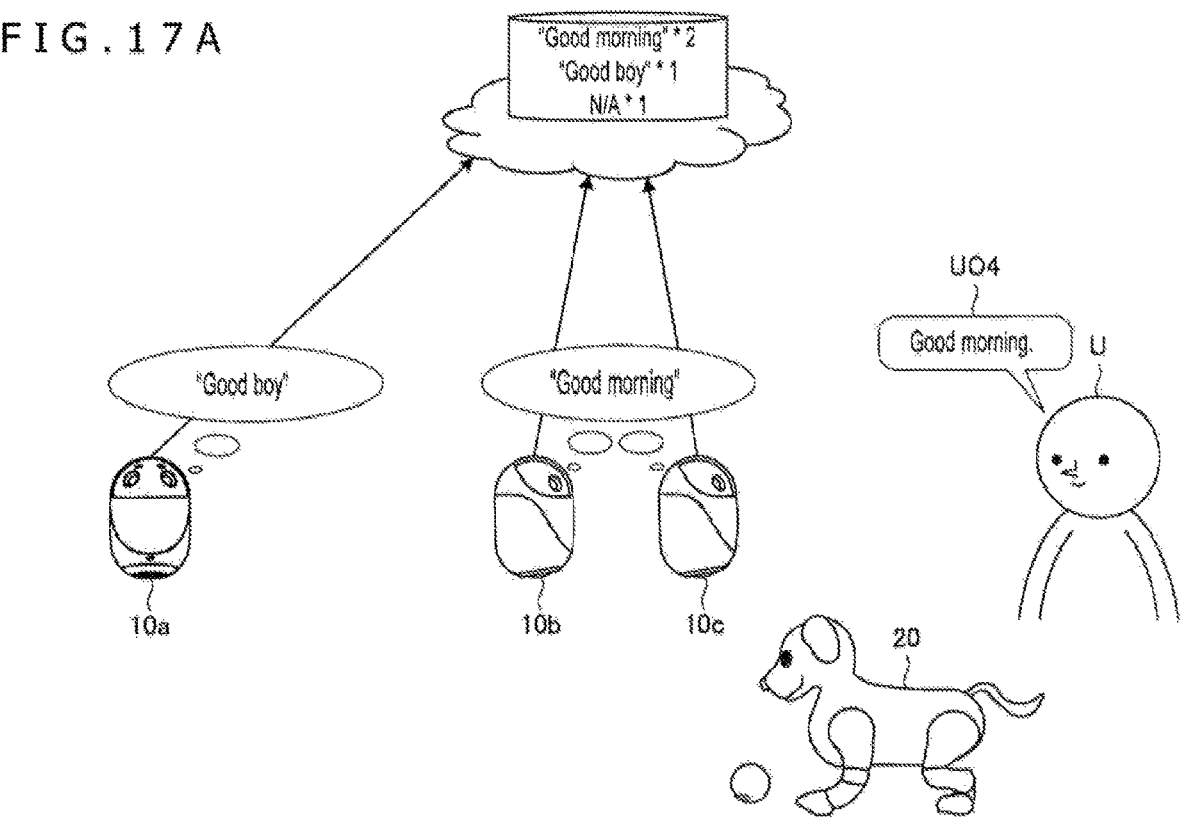
FIG. 17A is a diagram for explaining integration of voice recognition process results according to the embodiment.
Figure 17B:
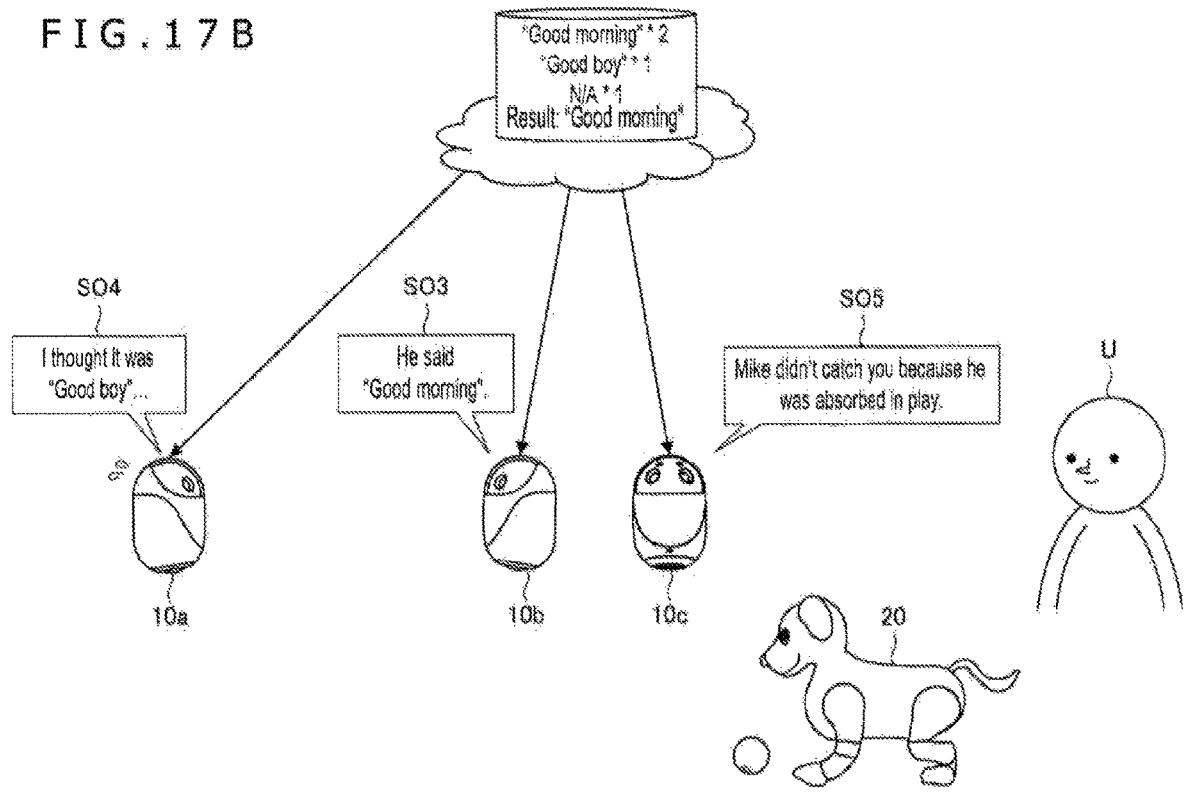
FIG. 17B is a diagram for explaining integration of voice recognition process results according to the embodiment.

FIGS. 17A and 17B are diagrams for explaining integration of voice recognition process results according to the present embodiment. FIG. 17A depicts a situation in which, in an environment where there are first operation bodies 10a to 10c and the second operation body 20, the user U makes a speech UO4.

In the example depicted in FIG. 17A, the first operation bodies 10a and 10b collect the voice of the speech UO4 with high accuracy, and obtain a correct phrase through the first voice recognition process, while the first operation body 10a fails to collect the voice of the speech UO4 with high accuracy because the first operation body 10a is at a distance from the user U, and thus, the first operation body 10a obtains an incorrect phrase through the first voice recognition process. Further, the second operation body 20 does not collect a voice sufficient for the second voice recognition process because the second operation body 20 is playing with a ball.

In this case, the control section 330 of the information processing server 30 integrates (compiles) the results of the voice recognition processes that are based on the respective voices collected by the operation bodies. It is to be noted that, in a case where voice data or a voice recognition result is not uploaded from an operation body that is present in the same environment, the control section 330 may consider that the operation body has failed to collect a voice.

In addition, the control section 330 according to the present embodiment may indirectly or directly control operations of the operation bodies by reporting an integration recognition result obtained as a result of the integration, to each of the operation bodies.

For example, in the example depicted in FIG. 17B, the control section 330 decides, as an integration recognition result, a phrase "Good morning" which is the most of a plurality of the obtained voice recognition results, and reports the integration recognition result to the first operation bodies 10a to 10c.

Also, the control section 330 according to the present embodiment may cause the first operation body 10b and the first operation body 10c, which each have collected the voice with which a voice recognition result identical to the integration recognition result has been obtained, to execute an action/speech regarding the first operation body 10a and the second operation body 20, which each have not obtained the identical voice recognition process result.

In the example depicted in FIG. 17B, the control section 330 causes the first operation body 10b to make a system speech SO3 to inform the first operation body 10a of a correct user intention. Further, the control section 330 causes the first operation body 10c to make a system speech SO5 indicating that the second operation body 20 has failed to catch the speech UO4.

On the other hand, the control section according to the present embodiment causes the first operation body 10a, which has collected a voice with which a voice recognition process result identical to the integration recognition result has not been obtained, to execute an action/speech indicating that the first operation body 10a has failed to obtain the identical voice recognition process result.

In the example depicted in FIG. 17B, the control section 330 causes the first operation body 10a to make a system speech SO4 indicating that the first operation body 10a has recognized an incorrect phrase.

As a result of the above control, a user speech can be recognized with high accuracy in accordance with results of voice recognition processes that are based on respective voices collected by a plurality of operation bodies, and further, a situation in which the operation bodies are talk with each other about the recognition results can be expressed. Accordingly, an effect to further attract a user's interest is expected.

Figure 18:
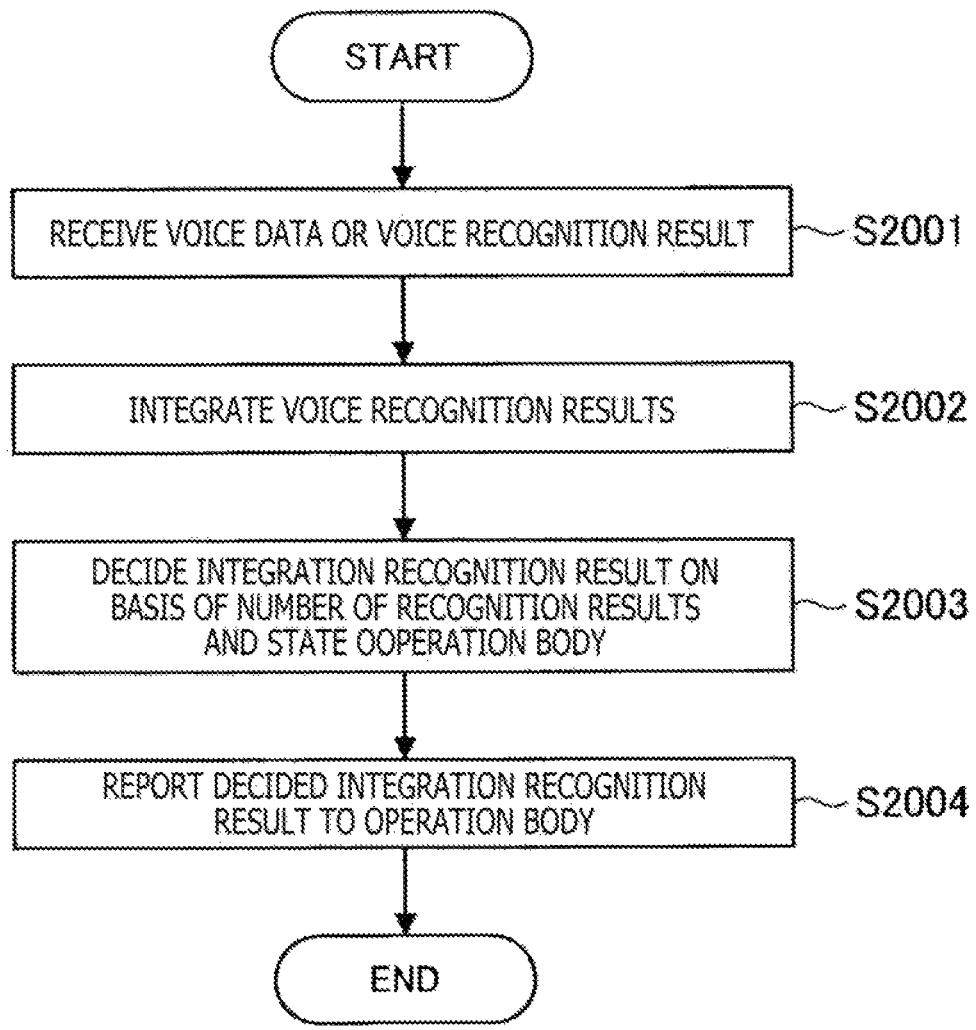
FIG. 18 is a flowchart depicting a flow in which the information processing server 30 integrates voice recognition results according to the embodiment.

Next, the flow of integrating voice recognition results and controlling operations according to the present embodiment will be explained. FIG. 18 is a flowchart depicting a flow in which the information processing server 30 integrates voice recognition results according to the present embodiment.

With reference to FIG. 18, first, the communication section 350 receives voice data or second voice recognition process results from a plurality of operation bodies (S2001).

Next, the control section 330 integrates a first voice recognition process result that is based on the voice data received in step S2001, and the second voice recognition process results received in step S2001 (S2002).

Next, the control section 330 decides an integration recognition result in accordance with the number of the recognition results and the states of the operation bodies at the voice collection time (S2003). The control section 330 may decide the integration recognition result through weighting based on not only the number of the recognition results but also the distance between each operation body and the user at the voice collection time, and the operation states of the operation bodies, for example.

Next, the control section 330 reports the integration recognition result decided in step S2003 to each of the operation bodies via the communication section 350 (S2004).

Figure 19:
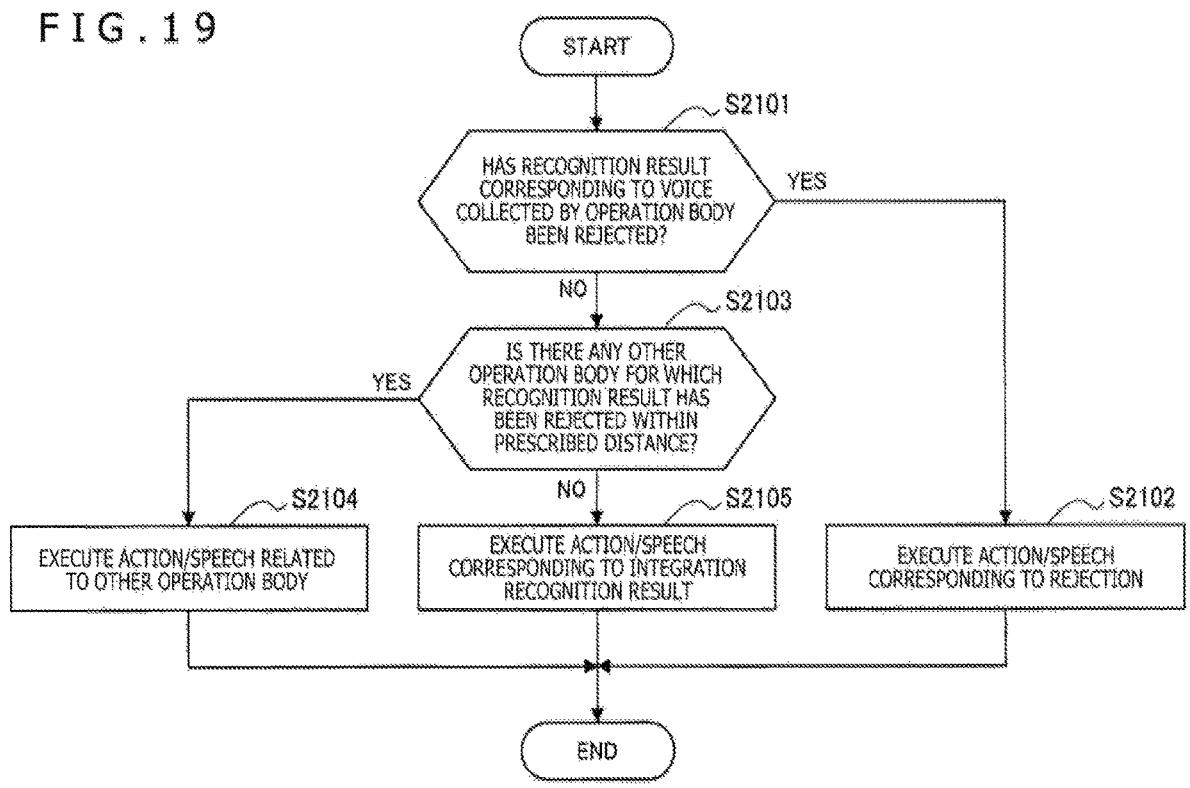
FIG. 19 is a flowchart depicting a flow of operation control based on an integration recognition result according to the embodiment.

FIG. 19 is a flowchart depicting a flow of operation control based on an integration recognition result according to the present embodiment.

With reference to FIG. 19, first, the control section of an operation body (the first operation body 10 or the second operation body 20) determines whether or not a recognition result corresponding to a voice collected by the operation body has been rejected, that is, whether or not a recognition result corresponding to the voice collected by the operation body differs from the integration recognition result (S2101).

In a case where the recognition result corresponding to the voice collected by the operation body has been rejected (YES in S2101), the operation body executes an action/speech corresponding to the rejection, that is, an action/speech indicating that obtainment of a voice recognition process result identical to the integration recognition result has failed (S2102).

On the other hand, in a case where the recognition result corresponding to the voice collected by the operation body has not been rejected, that is, the recognition result corresponding to the voice collected by the operation body is identical to the integration recognition result (NO in S2101), the control section of the operation body subsequently determines whether or not, within a prescribed distance (e.g. a visible distance), there is another operation body for which the recognition result has been rejected (S2103).

In a case where there is another operation body for which the recognition result has been rejected within the prescribed distance (YES in S2103), the operation body executes an action/speech regarding the other operation body (S2104).

In a case where there is no other operation body for which the recognition result has been rejected within the prescribed distance (NO in S2103), the operation body executes an action/speech corresponding to the integration recognition result (S2105).

One example of each function of the information processing system according to the present embodiment has been explained so far. It is to be noted that the information processing system according to the present embodiment may have any other function regarding cooperation among a plurality of operation bodies than the above example.

For example, in place of the second operation body 20 which does not have a function of performing communication using a language, the first operation body 10 according to the present embodiment can report a state of the second operation body 20 to a user.

Figure 20:
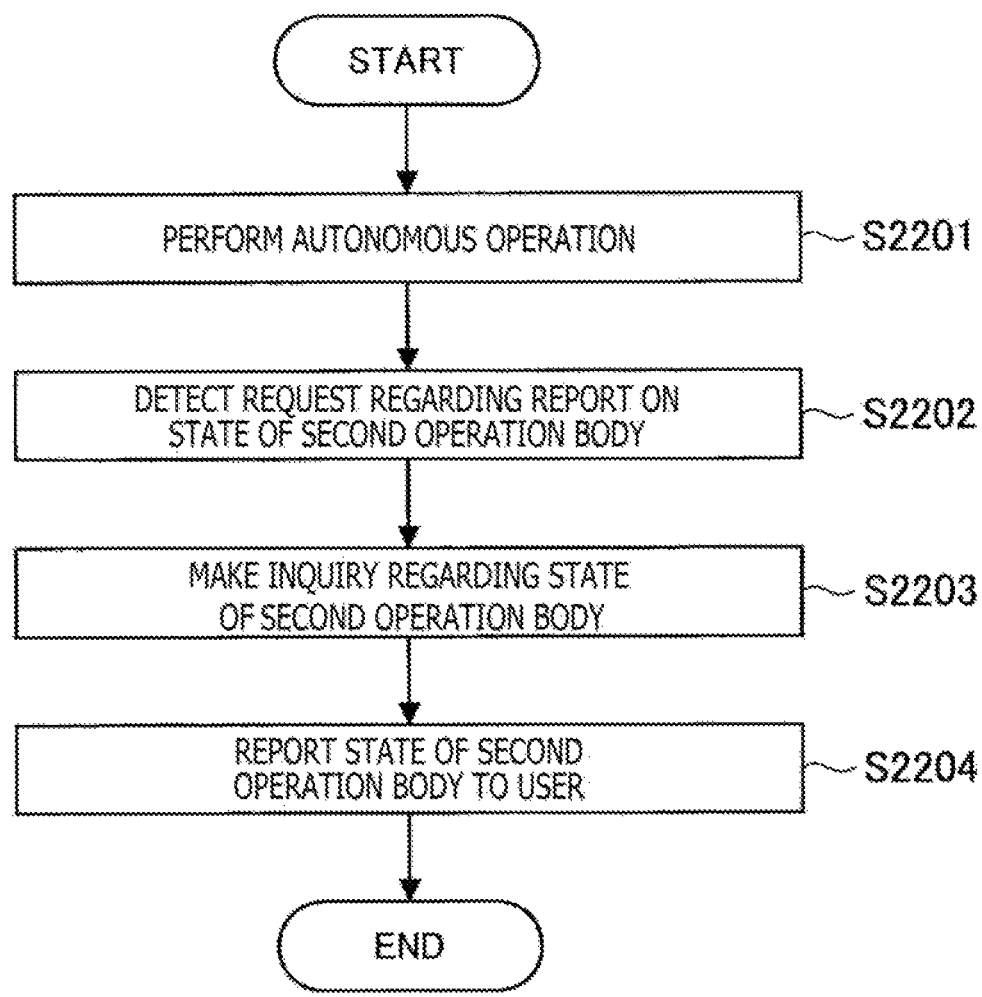
FIG. 20 is a flowchart depicting a flow in which the first operation body 10 reports the state of the second operation body according to the embodiment.

FIG. 20 is a flowchart depicting a flow in which the first operation body 10 reports the state of the second operation body according to the present embodiment.

With reference to FIG. 20, the first operation body 10 first performs an autonomous operation (S2201).

Then, when a request regarding reporting the state of the second operation body is detected from a user speech or an application being operated by the user (S2202), the first operation body 10 makes an inquiry about the state of the second operation body 20 (S2203). Here, the first operation body 10 may directly inquire of the second operation body 20 about the state of the second operation body 20, or may inquire of the information processing server 30 if the second operation body 20 has uploaded the state to the information processing server 30.

Next, the first operation body 10 reports, to the user, the state of the second operation body 20 obtained as a result of the inquiry in step S2203 (S2204). It is to be noted that the state of the second operation body 20 may include a dynamic state such as an emotion, a SLAM map being currently created, a recognized object, or a remaining battery capacity, or static information such as an individual identification number.

In addition, the first operation body 10 according to the present embodiment may issue various types of operation instructions to the second operation body 20.

The movement range of the second operation body 20 according to the present embodiment is wider than that of the first operation body 10, as described above. Therefore, in a case where, for example, the first operation body 10 which cannot move away from a desktop cannot recognize the user, the first operation body 10 may issue an instruction to move to a different room and search for the user.

Figure 21:
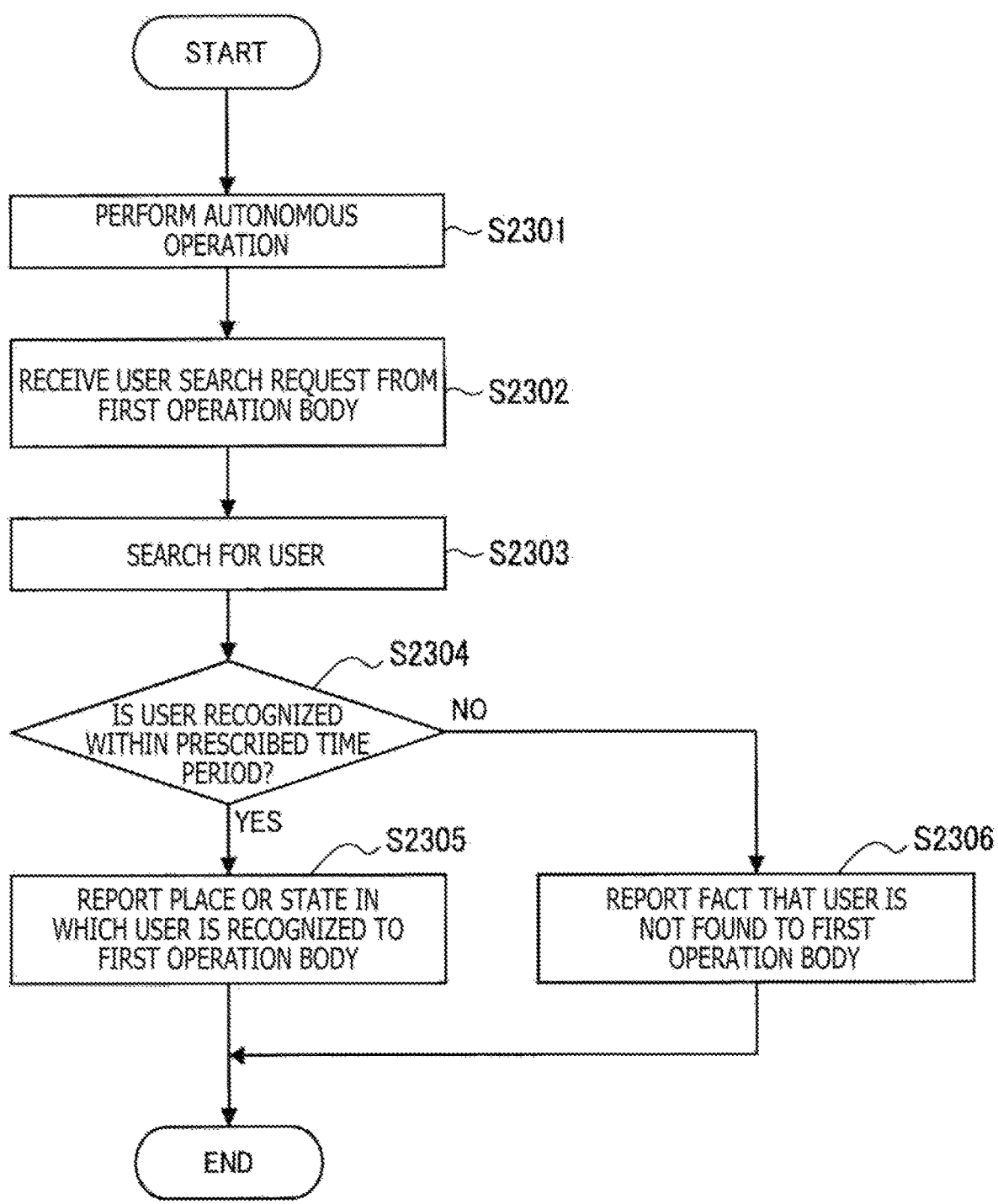
FIG. 21 is a flowchart of a flow in which the second operation body 20 searches for a user in accordance with an instruction provided by the first operation body 10 according to the embodiment.

FIG. 21 is a flowchart depicting a flow in which the second operation body 20 searches for a user in accordance with an instruction provided by the first operation body 10 according to the present embodiment.

With reference to FIG. 21, the second operation body 20 first performs an autonomous operation (S2301).

Then, in a case where a user search request is received from the first operation body 10 (S2302), the second operation body 20 walks around in a house, for example, and searches for the user (S2303).

In a case where the second operation body 20 recognizes a user within a prescribed time period (YES in S2304), the second operation body 20 reports a place and a condition in which the user has been recognized, to the first operation body 10 (S2305). In this case, the first operation body 10 may make an action/speech based on the reported information. For example, in a case where the report indicates that the user is in a kitchen, the first operation body 10 may make a speech "Mike told me that you are in the kitchen. Are you making dinner?" etc.

In a case where the user is not recognized within the prescribed time period (NO in S2304), the second operation body 20 reports, to the first operation body 10, that the user cannot be found (S2306).

It is to be noted that, in a case where a person other than the user, that is, a person to be searched is around the second operation body 20 at the reporting of information in step S2305 or S2306, the second operation body 20 may express the search result by using a cry or a gesture. For example, in a case where the user to be searched for is recognized in a kitchen, the second operation body 20 may make a gesture of eating something while wagging the tail. In a case where the user cannot be found, the second operation body 20 may conduct an action of sadly crying while shaking the head.

In addition, the first operation body 10 according to the present embodiment can provide an instruction to the second operation body 20 in accordance with information acquired from an external service such as an SNS or a message application, for example.

Figure 22:
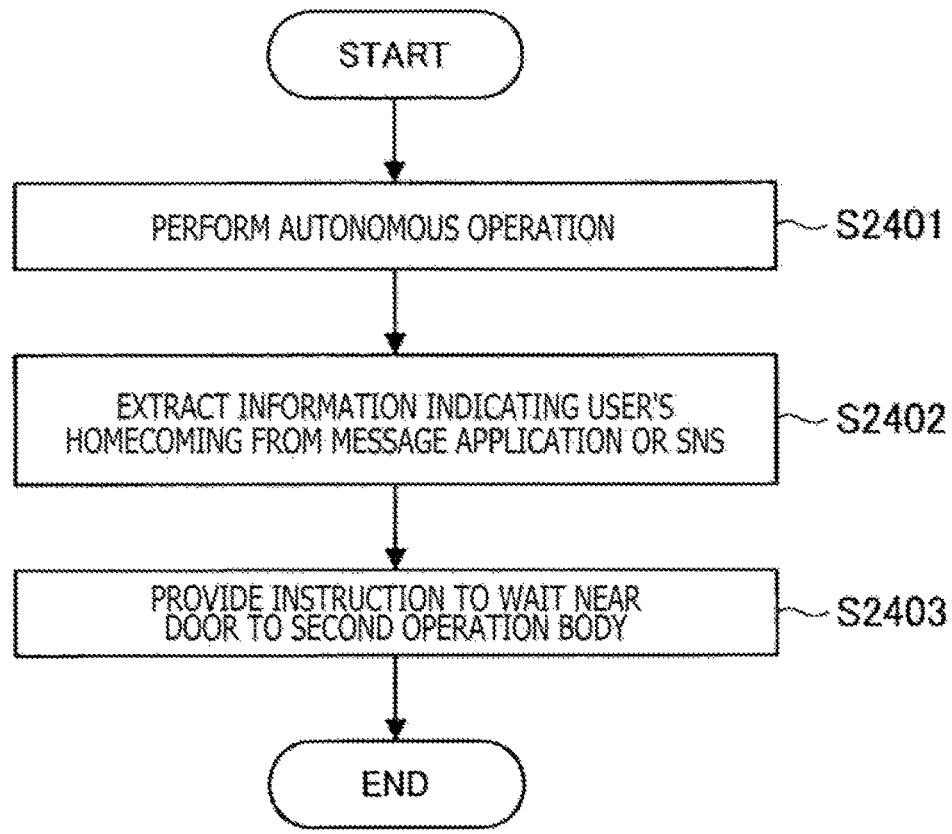
FIG. 22 is a flowchart depicting one example of a flow in which an instruction based on information acquired from an external service is provided to the second operation body 20 according to the embodiment.

FIG. 22 is a flowchart depicting one example of a flow in which an instruction based on the information acquired from the external service is provided to the second operation body 20 according to the present embodiment.

With reference to FIG. 22, the first operation body 10 first performs an autonomous operation (S2401).

Here, in a case where information indicating that a user is coming home is extracted from a message application or an SNS (S2402), the first operation body 10 may give an instruction to wait near the door to the second operation body 20 (S2403). In this case, the second operation body 20 waits near the door in accordance with the instruction from the first operation body 10. In addition, when the user who has come home is recognized, the first operation body 10 may make a speech "Mike, are you waiting near the door?", for example.

Therefore, the first operation body 10 according to the present embodiment may have a function of communicating with the user through a message application or an SNS. With this function, the user can enjoy interaction with the first operation body 10 even when being away from home, and further, can grasp a state of the second operation body 20 and a state of the house.

In addition, by making the best use of its high view point, the first operation body 10 according to the present embodiment can give, to the second operation body 20, a movement instruction to avoid obstacles, for example. Since the first operation body 10 according to the present embodiment is assumed to be placed on a table, as previously explained, the view point of the first operation body 10 is higher than that of the second operation body 20 which walks on a floor.

Figure 23A:
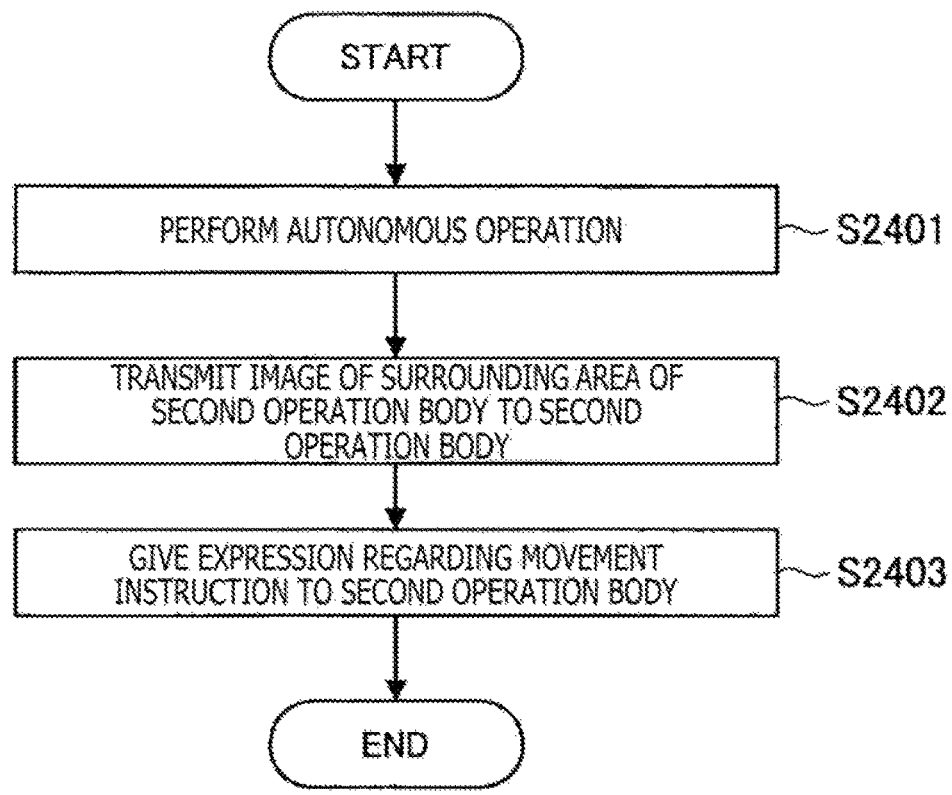
FIG. 23A is a flowchart depicting a flow in which the first operation body 10 provides a movement instruction to the second operation body 20 according to the embodiment.

FIG. 23A is a flowchart depicting a flow in which the first operation body 10 according to the present embodiment provides a movement instruction to the second operation body 20.

With reference to FIG. 23A, the first operation body 10 first performs an autonomous operation (S2401).

Next, the first operation body 10 transmits an image of the surrounding area of the second operation body 20 to the second operation body (S2402). The first operation body 10 may transmit the image on demand from the second operation body 20, or may transmit the image on the basis of that the second operation body 20 recognizes a situation in which a collision with an obstacle is likely to occur, for example.

Further, the first operation body 10 may give an expression regarding the movement instruction to the second operation body 20 (S2403). The first operation body 10 can make a speech "Watch out! The right side!", for example.

FIG. 23B is a flowchart depicting a flow in which the second operation body 20 operates in accordance with a movement instruction provided from the first operation body 10 according to the present embodiment.

With reference to FIG. 23B, the second operation body 20 first performs an autonomous operation (S2501).

Then, when receiving an image from the first operation body 10, the second operation body 20 maps, in an area around the second operation body 20, the image obtained from the view point of the first operation body 10 (S2502).

Next, the second operation body 20 moves while avoiding an obstacle in accordance with the image mapping in step S2502 (S2503).

<2. Hardware Configuration Example of Information Processing Server 30>

Figure 24:
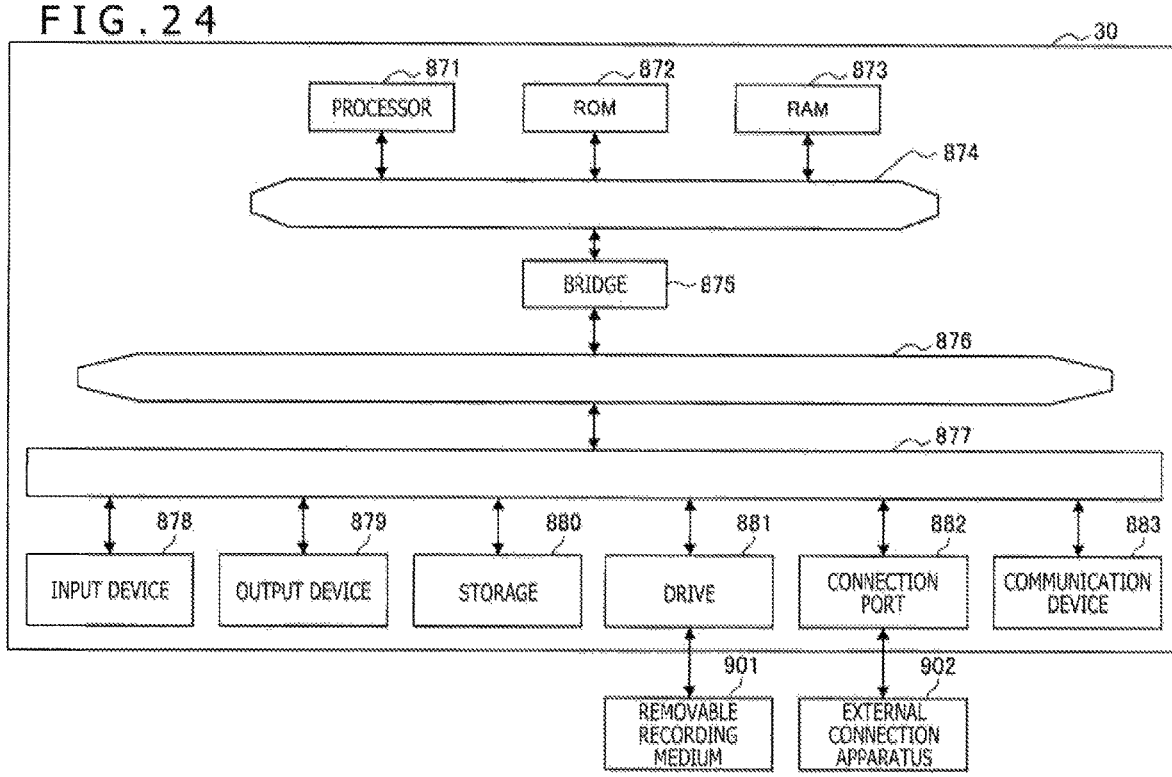
FIG. 24 is a diagram depicting a hardware configuration example according to one embodiment of the present disclosure.

Next, a hardware configuration example of the information processing server 30 according to one embodiment of the present disclosure will be explained. FIG. 24 is a block diagram depicting a hardware configuration example of the information processing server 30 according to one embodiment of the present disclosure. As depicted in FIG. 24, the information processing server 30 includes a processor 871, a ROM 872, a RAM 873, a host bus 874, a bridge 875, an external bus 876, an interface 877, an input device 878, an output device 879, a storage 880, a drive 881, a connection port 882, and a communication device 883, for example. It is to be noted that this hardware configuration is one example, and some of these component elements may be omitted. In addition, any other component element may be further included.

(Processor 871)

The processor 871 functions as a computation processing device or a control device, for example, and controls the entirety or a part of operations of the component elements in accordance with various programs recorded in the ROM 872, the RAM 873, the storage 880, or a removable recording medium 901.

(ROM 872, RAM 873)

The ROM 872 is means for storing a program to be read by the processor 871, data for use in computation, etc. For example, a program to be read by the processor 871, various parameters that vary, as appropriate, when the program is executed, and the like, are temporarily or permanently stored in the RAM 873.

(Host Bus 874, Bridge 875, External Bus 876, Interface 877)

The processor 871, the ROM 872, and the RAM 873 are mutually connected via the host bus 874 that can implement high-speed data transmission, for example. Meanwhile, the host bus 874 is connected, via the bridge 875, to the external bus 876 with which data transmission is implemented at relatively low speed, for example. Further, the external bus 876 is connected to the component elements via the interface 877.

(Input Device 878)

For example, a mouse, a keyboard, a touch panel, a button, a switch, a lever, or the like is used as the input device 878. Alternatively, a remote controller capable of transmitting a control signal by using infrared rays or any other radio waves may be used as the input device 878. In addition, examples of the input device 878 include a voice input device such as a microphone.

(Output Device 879)

The output device 879 is a display device such as a CRT (Cathode Ray Tube), an LCD, or an organic EL, an audio output device such as a loudspeaker or headphones, or a device, such as a printer, a mobile phone, or a facsimile, capable of notifying of acquired information to a user in a visible or audible manner, for example. In addition, examples of the output device 879 according to the present disclosure include various vibration devices capable of outputting tactile stimuli.

(Storage 880)

The storage 880 is a device for storing various data. For example, a magnetic storage device such as a hard disk drive (HDD), a semiconductor storage device, an optical storage device, or a magneto-optical device is used as the storage 880.

(Drive 881)

The drive 881 reads out information recorded in the removable recording medium 901 which is a magnetic disk, an optical disk, a magneto-optical disk, a semiconductor memory, or the like, or writes information into the removable recording medium 901.

(Removable Recording Medium 901)

The removable recording medium 901 is a DVD medium, a Blu-ray (registered trademark) medium, an HD DVD medium, or one of various types of semiconductor storage media, for example. Obviously, the removable recording medium 901 may be an IC card with a contactless type IC chip mounted thereon, or an electronic device, for example.

(Connection Port 882)

The connection port 882 is a port for connection with an external connection apparatus 902, such as a USB (Universal Serial Bus) port, an IEEE1394 port, an SCSI (Small Computer System Interface), an RS-232C port, or an optical audio terminal, for example.

(External Connection Apparatus 902)

The external connection apparatus 902 is a printer, a portable music player, a digital camera, or an IC recorder, for example.

(Communication Device 883)

The communication device 883 is a communication device for establishing connection to a network. For example, the communication device 883 is a communication card for a wired or wireless LAN, Bluetooth (registered trademark), or a WUSB (Wireless USB), a router for optical communications, a router for ADSL (Asymmetric Digital Subscriber Line), a modem for various communications, or the like.

<3. Conclusion>

As explained so far, the information processing server 30 according to one embodiment of the present disclosure includes the control section 330 that controls operations of operation bodies in accordance with a result of a voice recognition process. In addition, one of the characteristics of the control section 330 according to one embodiment of the present disclosure is to perform, in accordance with a result of a voice recognition process that is based on a voice collected by one operation body or a voice recognition environment recognized from sensor information collected by one operation body, control on an operation of another operation body. With this configuration, in an environment where there are a plurality of operation bodies that each perform an operation that is based on a voice recognition process, each of the operation bodies can perform an operation more suitable for the circumstance.

The preferred embodiment of the present disclosure has been explained with reference to the attached drawings, but the technical scope of the present disclosure is not limited to this example. It is clear that a person ordinarily skilled in the technical field of the present disclosure can conceive of various changes and modifications within the scope of the technical concept set forth in the claims. Such changes and modifications are also naturally considered to be included in the technical scope of the present disclosure.

In addition, the effects described herein are just examples, and thus, are not limitative ones but explanatory and exemplary ones. That is, the technology according to the present disclosure can provide any other effect that is obvious from the disclosure in the present description to a person skilled in the art, in addition to or instead of the above-mentioned effects.

In addition, a program for exerting functions equivalent to the functions of the components included in the first operation body 10, the second operation body 20, or the information processing server 30, can be created in hardware including a CPU, a ROM, and a RAM installed in a computer. Further, a computer-readable and non-transient recording medium that has such a program recorded therein can be provided.

In addition, the steps of the processes in the information processing system in the present description are not necessarily executed in time series in accordance with the order indicated in each flowchart. For example, the steps of the processes in the information processing system may be executed in an order that differs from that indicated in the flowcharts, or may be executed in parallel with each other.

It is to be noted that the following configurations are also included in the technical scope of the present disclosure.

(1)

An information processing apparatus including:
    a control section that controls operations of operation bodies in accordance with a result of a voice recognition process, in which
    in accordance with a result of a voice recognition process that is based on a voice collected by one of the operation bodies or a voice recognition environment recognized from sensor information collected by one of the operation bodies, the control section controls an operation of another one of the operation bodies.

(2)

The information processing apparatus according to (1), in which
    in accordance with a result of a voice recognition process that is based on a voice collected by one of the one operation bodies, the control section causes another one of the operation bodies to perform an operation corresponding to the voice recognition process result.

(3)

The information processing apparatus according to (2), in which
    the control section causes one of the operation bodies to perform an operation indicating that the result of the voice recognition process that is based on the voice collected by the one operation body has been reported to another one of the operation bodies.

(4)

The information processing apparatus according to (2) or (3), in which
    the operation bodies include a first operation body that performs an operation in accordance with a result of a first voice recognition process in which a first dictionary is used, and a second operation body that performs an operation in accordance with a result of a second voice recognition process in which a second dictionary including fewer phrases than the first dictionary is used, and
    in accordance with a result of the first voice recognition process that is based on a voice collected by the first operation body and the first dictionary, the control section causes the second operation body to perform an operation corresponding to the first voice recognition process result.

(5)
The information processing apparatus according to (4), in which
the control section extracts, from the second dictionary, a phrase corresponding to a category of a phrase obtained as the first voice recognition process result and reports the extracted phrase to the second operation body.

(6)
The information processing apparatus according to (4) or (5), in which
the control section controls phrase replacement in the second dictionary, in accordance with a log regarding the first voice recognition process result.

(7)
The information processing apparatus according to any one of (4) to (6), in which
the second operation body locally executes the second voice recognition process in which the second dictionary is used.

(8)
The information processing apparatus according to any one of (1) to (7), in which
the operation body is an autonomous mobile body.

(9)
The information processing apparatus according to (8), in which
in a case where a voice recognition environment regarding one of the operation bodies is able to become a factor to deteriorate accuracy of the voice recognition process, the control section controls an operation of another one of the operation bodies such that a voice recognition environment regarding the other operation body is improved.

(10)
The information processing apparatus according to (9), in which
the voice recognition environment includes an operation state of the operation body, and
in accordance with an operation state of one of the operation bodies, the control section controls an operation of another one of the operation bodies.

(11)
The information processing apparatus according to (10), in which
in a case where one of the operation bodies is performing an operation with an operation sound, the control section performs control to reduce an operation sound of another one of the operation bodies.

(12)
The information processing apparatus according to any one of (1) to (11), in which
the voice recognition environment includes a noise source/speaking person recognition result, and
the control section reports information regarding a noise source or a speaking person recognized from the sensor information collected by one of the operation bodies, to another one of the operation bodies.

(13)
The information processing apparatus according to (12), in which
in accordance with the information regarding the noise source or the speaking person recognized from the sensor information collected by one of the operation bodies, the control section controls whether or not to execute a voice recognition process regarding another one of the operation bodies.

(14)
The information processing apparatus according to any one of (1) to (13), in which
in accordance with an environment recognized from the sensor information collected by one of the operation bodies, the control section causes another one of the operation bodies to execute an active action toward a user.

(15)
The information processing apparatus according to (14), in which
in accordance with an environment recognized from the sensor information collected by one of the operation bodies, the control section causes another one of the operation bodies to make an active speech according to the environment.

(16)
The information processing apparatus according to any one of (1) to (15), in which
in accordance with an integration recognition result that is decided from a plurality of voice recognition process results that are respectively based on voices collected by a plurality of the operation bodies, the control section controls an operation of each operation body.

(17)
The information processing apparatus according to (16), in which
the control section causes the operation body that collects a voice with which a voice recognition process result identical to the integration recognition result has been obtained to execute an action/speech regarding the other operation body that fails to obtain a voice recognition process result identical to the integration recognition result.

(18)
The information processing apparatus according to (16) or (17), in which
the control section causes the operation body that collects a voice with which obtainment of a voice recognition process result identical to the integration recognition result has failed to execute an action/speech indicating that obtainment of a voice recognition process result identical to the integration recognition result has failed.

(19)
An information processing method including
controlling operations of operation bodies by means of a processor in accordance with a result of a voice recognition process, in which
the controlling further includes controlling an operation of another one of the operation bodies in accordance with a result of a voice recognition process that is based on a voice collected by one of the operation bodies or a voice recognition environment recognized from sensor information collected by one of the operation bodies.

(20)
A program for causing a computer to function as
an information processing apparatus including a control section that controls operations of operation bodies in accordance with a result of a voice recognition process, in which
in accordance with a result of a voice recognition process that is based on a voice collected by one of the operation bodies or a voice recognition environment recognized from sensor information collected by one of the operation bodies, the control section controls an operation of another one of the operation bodies.

REFERENCE SIGNS LIST

10: First operation body
140: Trigger detection section

150: Control section
20: Second operation body
240: Recognition section
242: Second dictionary
250: Control section
30: Information processing server
310: Voice recognition section
320: Natural language processing section
322: First dictionary
330: Control section
40: Network

The invention claimed is:

1. An information processing apparatus, comprising:
a control section configured to:
   execute, based on a voice collected by a first operation body of a plurality of operation bodies, a first voice recognition process to obtain a first voice recognition process result that includes a phrase corresponding to the voice, wherein the phrase is registered in a first dictionary associated with the information processing apparatus;
   determine the phrase is unregistered in a second dictionary, wherein the second dictionary is associated with a second operation body of the plurality of operation bodies; and
   control, in response to the determination that the phrase is unregistered in the second dictionary, an operation of the second operation body based on one of:
      the first voice recognition process result that is based on the first dictionary, or
      a voice recognition environment recognized from sensor information collected by the first operation body.

2. The information processing apparatus according to claim 1, wherein the control section is further configured to control, based on the first voice recognition process result, the second operation body to execute the operation corresponding to the first voice recognition process result.

3. The information processing apparatus according to claim 2, wherein the control section is further configured to control the first operation body to execute an operation that indicates that the first voice recognition process result has been reported to the second operation body.

4. The information processing apparatus according to claim 2, wherein the control section is further configured to:
   execute, based on the voice and the first dictionary, the first voice recognition process to obtain the first voice recognition process result, wherein the plurality of operation bodies includes:
      the first operation body that executes an operation based on the first voice recognition process result, and
      the second operation body that executes an operation based on a result of a second voice recognition process in which the second dictionary including fewer phrases than the first dictionary is used; and
   control, based on the first voice recognition process result, the second operation body to execute the operation corresponding to the first voice recognition process result.

5. The information processing apparatus according to claim 4, wherein the control section is further configured to:
   extract, from the second dictionary, a phrase corresponding to a category of the phrase included in the first voice recognition process result; and report the extracted phrase to the second operation body.

6. The information processing apparatus according to claim 4, wherein the control section is further configured to control phrase replacement in the second dictionary based on a log regarding the first voice recognition process result.

7. The information processing apparatus according to claim 4, wherein the second operation body locally executes the second voice recognition process based on the second dictionary.

8. The information processing apparatus according to claim 1, wherein each of the first operation body and the second operation body is an autonomous mobile body.

9. The information processing apparatus according to claim 8, wherein in a case where a voice recognition environment regarding the second operation body is a factor to deteriorate accuracy of a second voice recognition process, the control section is further configured to control an operation of the first operation body such that the voice recognition environment regarding the first operation body is improved.

10. The information processing apparatus according to claim 9, wherein
   the voice recognition environment regarding the second operation body includes an operation state of the second operation body, and
   the control section is further configured to control, based on the operation state of the second operation body, an operation of the first operation body.

11. The information processing apparatus according to claim 10, wherein in a case where the second operation body executes an operation with an operation sound, the control section is further configured to reduce an operation sound of the first operation body.

12. The information processing apparatus according to claim 1, wherein
   the voice recognition environment includes one of information regarding a noise source or information regarding a speaking person,
   the information regarding the noise source and the information regarding the speaking person are recognized from the sensor information collected by the first operation body, and
   the control section is further configured to report, one of the information regarding the noise source or the information regarding the speaking person, to the second operation body.

13. The information processing apparatus according to claim 12, wherein the control section is further configured to control, based on one of the information regarding the noise source or the information regarding the speaking person, whether to execute a second voice recognition process regarding the second operation body.

14. The information processing apparatus according to claim 1, wherein the control section is further configured to control, based on an environment recognized from the sensor information collected by the first operation body, the second operation body to execute an active action toward a user.

15. The information processing apparatus according to claim 14, wherein the control section is further configured to control, based on the environment recognized from the sensor information collected by the first operation body, the second operation body to output an active speech according to the environment.

16. The information processing apparatus according to claim 1, wherein
   the control section is further configured to control an operation of each operation body of the plurality of operational bodies based on an integration recognition result that is determined from a plurality of voice recognition process results, the plurality of voice recognition process results is respectively obtained based on a plurality of voices collected by the plurality of operation bodies, the plurality of voice recognition process results includes the first voice recognition process result, and the plurality of voices includes the voice collected by the first operation body.

17. The information processing apparatus according to claim 16, wherein in a case where the first voice recognition process result is identical to the integration recognition result, the control section is further configured to control the first operation body to execute one of an action or a speech regarding the second operation body that fails to obtain a voice recognition process result identical to the integration recognition result.

18. The information processing apparatus according to claim 16, wherein in a case where the second operation body has failed to obtain a voice recognition process result identical to the integration recognition result, the control section is further configured to control the second operation body to execute one of an action or a speech indicating that the obtainment of the voice recognition process result identical to the integration recognition result has failed.

19. An information processing method, comprising:
executing, based on a voice collected by a first operation body of a plurality of operation bodies, a voice recognition process to obtain a voice recognition process result that includes a phrase corresponding to the voice, wherein the phrase is registered in a first dictionary associated with an information processing apparatus;
determining the phrase is unregistered in a second dictionary, wherein the second dictionary is associated with a second operation body of the plurality of operation bodies; and
controlling, in response to the determination that the phrase is unregistered in the second dictionary, an operation of the second operation body based on one of:
the voice recognition process result that is based on the first dictionary, or
a voice recognition environment recognized from sensor information collected by the first operation body.

20. A non-transitory computer-readable medium having stored thereon computer-executable instructions that, when executed by a computer, cause the computer to execute operations, the operations comprising:
executing, based on a voice collected by a first operation body of a plurality of operation bodies, a voice recognition process to obtain a voice recognition process result that includes a phrase corresponding to the voice, wherein the phrase is registered in a first dictionary associated with an information processing apparatus;
determining the phrase is unregistered in a second dictionary, wherein the second dictionary is associated with a second operation body of the plurality of operation bodies; and
controlling, in response to the determination that the phrase is unregistered in the second dictionary, an operation of the second operation body based on one of:
the voice recognition process result that is based on the first dictionary, or
a voice recognition environment recognized from sensor information collected by the first operation body.

* * * * *